US011726788B2

(12) United States Patent
Jacob et al.

(10) Patent No.: US 11,726,788 B2
(45) Date of Patent: Aug. 15, 2023

(54) TUPLE CHECKOUT WITH NOTIFY IN COORDINATION NAMESPACE SYSTEM

(71) Applicant: International Business Machines Corporation, Armonk, NY (US)

(72) Inventors: Philip Jacob, Congers, NY (US); Philip Neil Strenski, Yorktown Heights, NY (US); Charles Johns, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 773 days.

(21) Appl. No.: 16/719,397

(22) Filed: Dec. 18, 2019

(65) Prior Publication Data
US 2021/0191727 A1   Jun. 24, 2021

(51) Int. Cl.
*G06F 9/38* (2018.01)
*G06F 16/23* (2019.01)

(52) U.S. Cl.
CPC ........ *G06F 9/3838* (2013.01); *G06F 16/2365* (2019.01)

(58) Field of Classification Search
CPC ........................... G06F 9/3828; G06F 16/2365
USPC ....................................................... 707/705
See application file for complete search history.

(56) References Cited

U.S. PATENT DOCUMENTS

| | | | |
|---|---|---|---|
| 8,204,856 B2 | 6/2012 | Meyer et al. | |
| 8,255,430 B2 | 8/2012 | Dutton et al. | |
| 10,084,634 B2 | 9/2018 | Leppanen et al. | |
| 10,244,053 B2 | 3/2019 | Bestler et al. | |
| 10,275,179 B2 | 4/2019 | Petrocelli | |
| 2012/0017037 A1* | 1/2012 | Riddle | G06F 16/24569 711/E12.008 |
| 2013/0060818 A1* | 3/2013 | Lambeth | H04L 41/0896 707/E17.005 |
| 2013/0060944 A1* | 3/2013 | Archer | G06F 15/17306 709/225 |

(Continued)

OTHER PUBLICATIONS

Anonymous, "Method and System to detect when a face-to-face meeting is occurring, recording actions and share among participants", IP.com, IPCOM000254720D, Jul. 25, 2018, 4 pages.

(Continued)

*Primary Examiner* — Tony Mahmoudi
*Assistant Examiner* — Kamal K Dewan
(74) *Attorney, Agent, or Firm* — Scully, Scott, Murphy & Presser, P.C.; Daniel P. Morris, Esq.

(57) ABSTRACT

A system and method for notifying a process about a creation or removal event of a named data element (NDE) in a coordination namespace distributed memory system. A controller runs methods to: generate a tuple corresponding to data generated by a requesting process, the tuple having a tuple name and data value; and generate a notification indicator in a pending notification list to indicate to one or more processes a notification of the creation or removal event associated with the corresponding tuple. Upon detecting the event performed on the tuple by a second process, the method further searches for NDEs in the distributed memory system having the same tuple name, and in response to determining an existence of an associated pending notification record in a pending notification list of records, notify each corresponding process of the one or more processes indicated in the list of the creation or removal event.

20 Claims, 11 Drawing Sheets

(56) References Cited

U.S. PATENT DOCUMENTS

| | | | |
|---|---|---|---|
| 2016/0065490 A1 | 3/2016 | Leff et al. | |
| 2016/0253098 A1* | 9/2016 | Holbrook | H04L 45/7453 711/147 |
| 2017/0024411 A1* | 1/2017 | Shvachko | G06F 16/1844 |
| 2017/0170955 A1 | 6/2017 | Wood et al. | |
| 2018/0150397 A1* | 5/2018 | Gupta | G06F 12/0815 |
| 2018/0188993 A1* | 7/2018 | Frank | G06F 16/2246 |
| 2018/0203641 A1* | 7/2018 | Petrocelli | G06F 3/0647 |
| 2021/0141630 A1* | 5/2021 | Sharpe | G06F 11/201 |
| 2022/0173968 A1* | 6/2022 | Koponen | H04L 45/036 |

OTHER PUBLICATIONS

Mariani et al., "Novel Opportunities for Tuple-based Coordination: XPath, the Blockchain, and Stream Processing", 18th Workshop From Objects to Agents (WOA 2017), Scilla, RC, Italy, Jun. 16, 2017, 4 pages.

Belyaev et al., "Component-oriented access control-Application servers meet tuple spaces for the masses", Future Seneration Computer Systems, 2017, Accepted May 5, 2017, pp. 1-14.

Anonymous, "A Method to Support Multiple Keys in Table Lookup Engines", IP.com, IPCOM000246002D, Apr. 25, 2016, 8 pages.

Anonymous, "Method for smart namespace schema discovery for third party data source providers of linked data", IP.com, IPCOM000231061D, Sep. 25, 2013, 4 pages.

IBM, "A method for efficient creation of notifications in SIP", IP.com, IPCOM000188098D, Sep. 22, 2009, 3 pages.

Bicocchi et al., "Context-Aware Coordination in the Sensors' Continuum", Ubiquitous Computing and Communication Journal, CPE—Special Issue, —ISSN 1992-8424, 2008, pp. 1-12.

Nixon et al., "Coordinating Knowledge in Pervasive Environments", Ubiquitous Computing and Communication Journal, Jan. 2007, Conference: 16th IEEE International Workshops on Enabling Technologies: Infrastructures for Collaborative Enterprises (WETICE 2007), Jun. 18-20, 2007, Paris, France, pp. 1-13.

IBM, "Supporting Namespaces in Meta-Models That Have No Direct Namespace Support", IP.com, IPCOM000021493D, Jan. 21, 2004, 6 pages.

Murphy et al., "LIME: A Coordination Middleware Supporting Mobility of Agents and Hosts", Washington University in St. Louis, Department of Comuputer Science & Engineering, St. Louis, MO, 63130, Apr. 7, 2003, pp. 1-28.

Carbunar et al., "Coordination and Mobility in CoreLime", Math. Struct. in Comp. Science, received Mar. 9, 2002, pp. 1-24.

Rossi et al., Tuple-based technologies for coordination, Apr. 8, 2005, pp. 1-27.

Papadopoulos et al., "Coordination of Distributed and Parallel Activities in the IWIM Model", International Journal of High Speed Computing 9(02):127-160 • Jun. 1997, pp. 1-37.

Jagannathan, "Optimzing Analysis for First-Class Tuple-Spaces", Department of Computer Science, Yale University, New Haven, CT 06520, MIT Press, 1991, pp. 1-23.

* cited by examiner

US 11,726,788 B2

TUPLE CHECKOUT WITH NOTIFY IN COORDINATION NAMESPACE SYSTEM

STATEMENT REGARDING FEDERALLY SPONSORED RESEARCH OF DEVELOPMENT

This invention was made with U.S. Government support under Contract. No. B621073 awarded by the Department of Energy. The government has certain rights to this invention.

FIELD

The present invention generally relates to distributed memory architectures implementing a shared namespace memory management system, and particularly a hardware acceleration mechanism for supporting coordination between processes on created/deleted tuples including the triggering of notifications to processes owning tuple records when a tuple record is removed or modified.

BACKGROUND

When tuples for data generated in a shared namespace (such as in a coordination namespace system or "CNS") are being shared by more than one process—it could become necessary to notify one or more processes that are monitoring activity on a tuple record that it has been modified or removed from the system by another process.

SUMMARY

A hardware accelerated system and method for supporting coordination between processes in a distributed memory architecture implementing a shared namespace system and improving the effectiveness of sharing tuples between CNS nodes and processes.

In the shared namespace system implementing a distributed key value store, a mechanism for monitoring activity of tuple records owned by processes and triggering notifications to the processes when a tuple is removed or created/modified by other processes in the system.

A system and method to build upon a CNS architecture and its distributed key value store including the use of CNS application programming interface commands, along with tuple engine and data structure modifications to support process notify operations.

In one aspect, there is provided a method for notifying one or more processes of a creation or removal event associated with a named data element (NDE) created in a coordination namespace, the one or more processes running at one or more distributed computing nodes sharing the coordination namespace. The method comprises: generating, by a controller running at a computing node, a named data element (NDE) for a requesting process running at the computing node; the NDE having an associated keyname and associated data for storage in a memory associated with the node; receiving, at the controller, from the requesting process, a request with notify message to access the stored associated data; generating, by the controller, responsive to a data access request, a pending notification record for the requesting process, the pending notification record having information including a process identifier for the requesting process to receive a notification of a creation or removal of the generated NDE, the pending notification record stored in the memory at the computing node; detecting, by the controller, another process running at one or more of the distributed computing nodes creating a new named data element for the keyname or removing, by the another process, the generated named data element corresponding to the keyname for the local process; in response to the detecting, identifying, by the controller, in the pending notification record the process identifier of the requesting process; and communicating, by the controller, a notification message to the requesting process corresponding to the process identifier, the notification message indicating to the requesting process of the creating or removing of the generated NDE for the requesting process.

In accordance with a further aspect of the invention, there is provided a system for notifying one or more processes of a creation or removal event associated with a named data element (NDE) created in a coordination namespace, the one or more processes running at one or more distributed computing nodes sharing the coordination namespace. The system comprises: one or more data generated by requesting processes running at a current computing node; and a memory storage element associated with a current node of the multi-node computing system sharing the coordination namespace; and a controller circuit coupled with the memory storage element, the controller circuit configured to: generate, for a requesting process, a named data element (NDE) for storage in a memory at the computing node, the NDE having an associated keyname and associated data for storage in the memory; receive, from the requesting process, a request with notify message to access the stored associated data; generate, responsive to a data access request, a pending notification record for the requesting process, the pending notification record having information including an identification information for the requesting process to receive a notification of a creation or removal of the generated NDE, and store the pending notification record in the memory at the computing node; detect another process running at one or more of the distributed computing nodes creating a new named data element for the keyname or removing, by the another process, the generated named data element corresponding to the keyname for the requesting process; in response to the detecting, identify in the pending notification record the process identifier of the requesting process; and communicate a notification message to the requesting process corresponding to the process identifier, the notification message indicating to the requesting process of the creating or removing of the generated NDE for the requesting process.

The present invention is advantageously employed in a multiprocessing computer system having a plurality of processor devices accessing distributed memory system with multiple nodes with their own attached independent memory, however, can easily be adapted for use in multi-core uniprocessor computer systems or for accessing shared memory architectures through coherency protocols.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION

Figure 1:
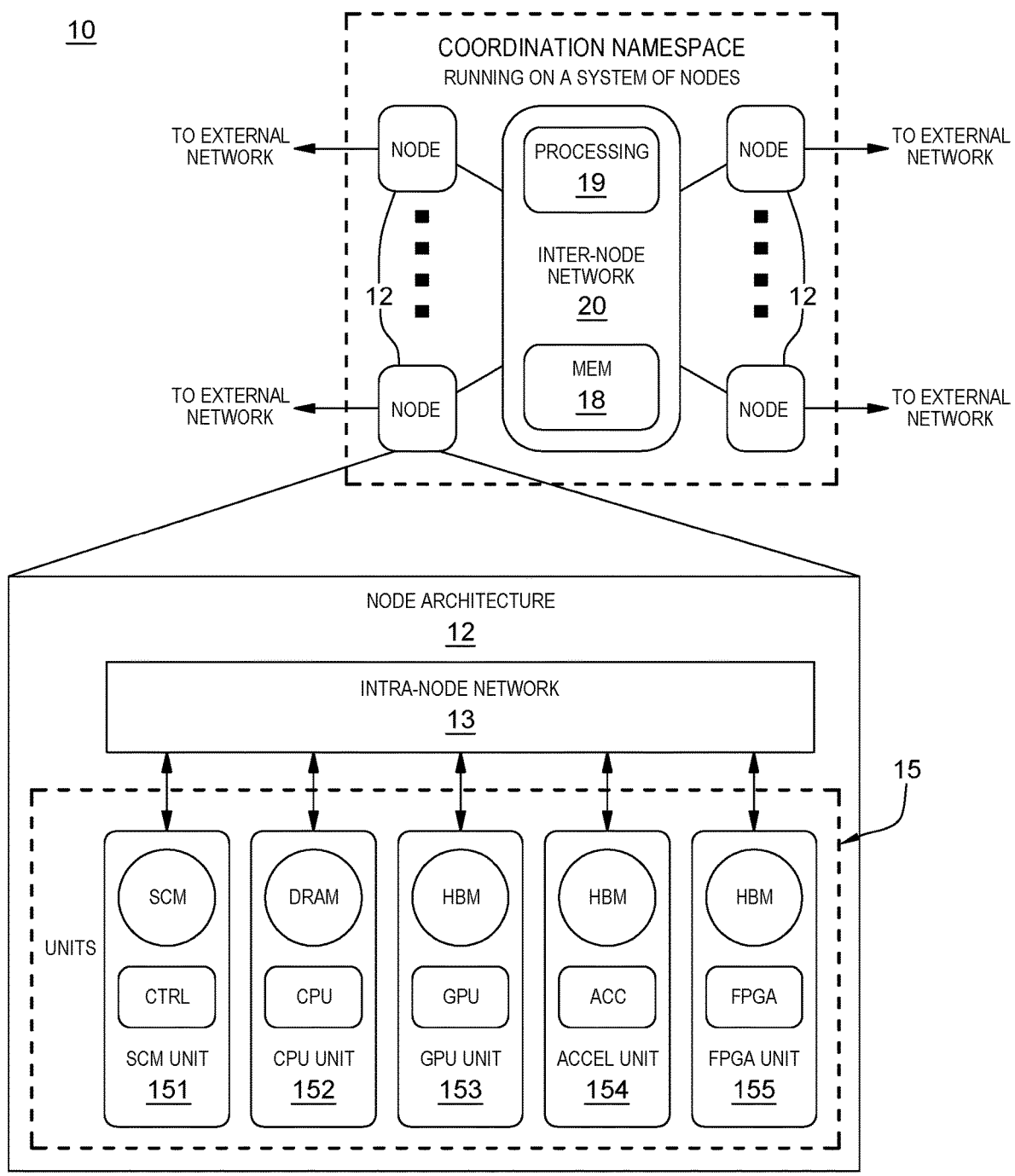
FIG. 1 illustrates an extended memory architecture constructed using a node architecture of multiple processing nodes in which the present systems and methods are employed according to embodiments herein.

The present disclosure provides a novel hardware acceleration mechanism to support notify operations for data generated by processes in a multi-node computing system having an extended memory defining a coordination namespace. According to embodiments, a tuple checkout system with notification include operations for processing data in a parallel distributed system and includes components for notifying one or more processes when a Named Data Element (NDE) or "tuple" has been created or removed. The coordination namespace system provides an architecture to efficiently perform the notify operations and improve the effectiveness of sharing tuples between CNS nodes and processes.

In an embodiment, the description makes use of and extends the Coordinated Namespace (CNS) system and methods described in commonly-owned, co-pending U.S. patent application Ser. No. 16/217,905 entitled Coordinated Namespace Processing, the whole contents and disclosure of each of which are incorporated herein by reference as if wholly set forth herein. The description further makes use of and extends the systems and methods described in commonly-owned, co-pending U.S. patent application Ser. Nos. 15/851,480 and 15/851,511, both entitled Data Shuffling With Hierarchical Tuple Spaces and incorporated by reference herein.

The following are abbreviations of terms representing entities involved in the various system and methods herein for tuple checkout with notification operations in a CoordinationSpace (CS) or CoordinationNameSpace (CNS) system.

A Named Data Element (NDE) is a tuple record having meta data including tuple name, size, location, pointers and tuple data.

An ActualHome (AH) or Home, is a node where the named data element (tuple) is actually stored.

A NaturalHome (NH) is the node identified from the hash applied to the tuple name.

A PreferredHome (PH) can be the NH or identified from a user-specified group. The PH for csOUT identifies where to place the tuple and for a csIN where to look first for the tuple.

A HashElement (HE) refers to a single (one) record per unique name in CNS, e.g., one HE for one or more tuples of the same name.

A PendingRecord (PR) is a tuple record that identifies a pending request for a tuple that has not been created.

A LocalTuple (LT) represents a metadata record and associated data at the actual home.

A RemoteTuple (RT) represents a metadata record at the NH identifying a tuple homed elsewhere.

Storage class memory (SCM) is any byte-addressable persistent memory.

A Work queue (WQ) is a hardware work queue processed by a hardware work queue manager (WQM). A tuple engine is activated by the WQM to process the tuple request in the WQ. The work queue manager, work queue and tuple engines can be implemented in a programmable core or any computing device or circuit structure running a microcode logic circuit implementation to implement the work queue/tuple engines. Alternately, the work manager functions can be a programmable accelerator implementing these functions.

FIG. 1 depicts a schematic diagram of a multi-node computer system in which a hardware process notification system and method of the invention are employed. FIG. 1 is particularly illustrative of an extended memory architecture 10 constructed using a node architecture of multiple processing nodes 12. At the conceptual level, this architecture enables constructing a system from "units" 15 that combine memory pools and processing capability. In an embodiment, multiple types of units 15 are possible. A node 12 may contain a single unit or multiple units 15. Examples of units 15 in a node, may include a memory service unit (Storage Class Memory Unit) 151, a Sequential Processing unit (e.g., a DRAM and CPU) 152, a Throughput Processing unit (High Bandwidth Memory and Graphic Processing Unit (GPU))) 153, and acceleration unit 154 or circuit unit 155.

In an embodiment, each of the units 15 are independent and treated as peers under the extended memory architecture 10. These units may be optimized for specific computational and memory task. The architecture depicts a collection of units where intra-node network 13 provides an efficient coherent interconnect between the units within a single node 15 and Inter-node network 20, e.g., Ethernet or Infiniband® or like network, interconnecting the computing nodes 12 within the system 10. Similar to a unit, the Inter-node Network 20 may also contain memory 18 and associated processing 19. The "external networks" identify access beyond the extended memory architecture 10.

In embodiments, methods are implemented for dynamically creating a logical grouping of units from one or more Nodes 12 to perform an application, wherein at least one of these units can run an operating system including a master process (not shown) that can setup the CNS system to run on a system of nodes. The units 15 may be, for example, a combination of general-purpose processors, special purpose processors, programmable logic devices, controllers, memory, and the like. To dynamically configure a logical group, these units need to appear to software, especially the operating system and device drivers, as if these are all part of a physically connected system within the shared memory space. To support the connected view, a system manager or management software may assign each unit within a node 12 to an application. A system manager (not shown) may schedule jobs that run over the full set of nodes in the system, start jobs (applications or workflows), and assign the resources at job launch when the required resources are available.

As described in herein incorporated co-pending U.S. patent application Ser. No. 16/217,905, the content and disclosure of which is incorporated by reference herein, the extended memory (EM) architecture 10 architecture for accessing memory beyond a node 12. The EM architecture includes a method for accessing memory distributed over the full or subset of the system referred to as Coordination Namespace (CSN) method. Nodes within the extended memory architecture have major characteristics: (1) Capable of being managed by a single operating system; (2) Efficient coherent load/store access to all memory pools within the node; (3) a Global Virtual Address Space for referencing memory pools inside and outside the node; and (4) access to a system wide Coordination Namespace.

As described in commonly-owned, co-pending U.S. patent application Ser. No. 16/217,905, the Coordination Namespace (CNS) is a hardware system implementing methods providing support for treating system memory or storage class memory as a key/value store with blocks of data referenced using a "name" or key.

Figure 2:
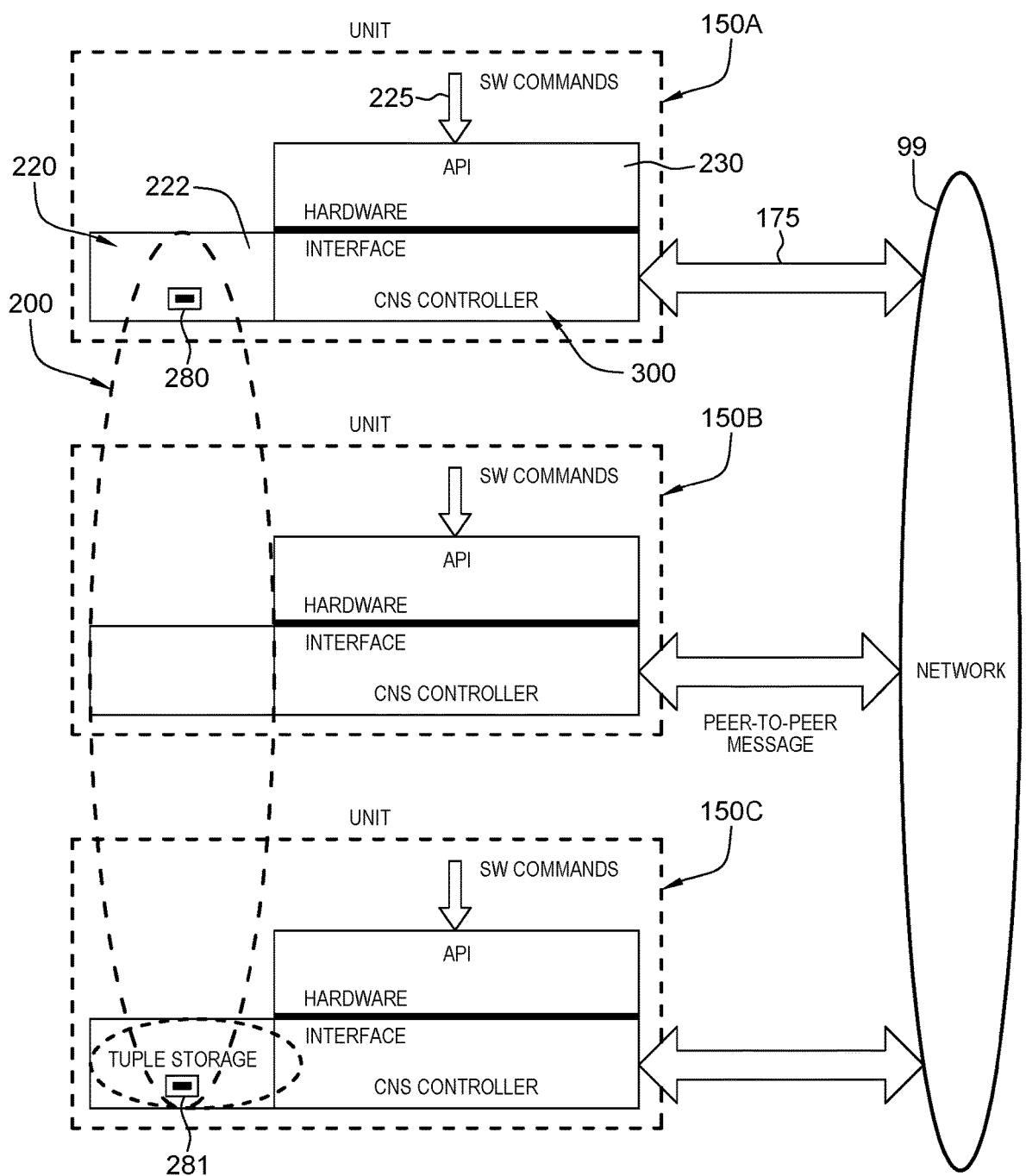
FIG. 2 shows a CNS architecture depicting networked connection of units across one or more nodes of the extended memory architecture of FIG. 1.

FIG. 2 shows a CNS architecture 100 depicting networked connection of units 150A, 150B, 150C . . . etc. across one or more nodes of the extended memory architecture 10. In an embodiment, units 150A, 150B, 150C etc. are independent and treated as peers under the extended memory architecture. These units can be for example, any combination of processors, programmable logic, controllers, or memory optimized for a specific computational/memory task. The architecture 100 depicts a collection of units where inter-node network 20 provides an efficient coherent interconnect between the units across the system.

In an example embodiment, each unit 150A, 150B, 150C . . . etc. contains a pool of memory that is divided into one or more regions each having one of three designations: (1) Globally accessible; (2) NDE storage 220; and (3) Local 222. One embodiment of the extended memory architecture may aggregate memory regions designated as globally accessible into a Global Virtual Address Space and allocate memory regions designated as NDE storage to a distributed Coordination Namespace 200.

FIG. 2 conceptually depicts the Coordination Namespace storage system 200 distributed across units 150A, 150B, 150C . . . etc. in the extended memory architecture. Units, e.g., unit 150B, do not have to contribute to storage. Units 150A, 150B, 150C . . . etc. can access CNS 200 even if not contributing storage.

As shown in FIG. 2, the plural units distributed across nodes of the extended memory architecture include at least one hardware CNS controller 300 that provides access to the Coordination Namespace. The CNS storage structure 200 provides an alternate view of extended memory that is separate from a processes' virtual address space local to the unit. In the Coordination Namespace, references to extended memory use a "name" for accessing a finite, ordered list of immutable values referred to as a Named Data Element (NDE) or "tuple". In an exemplary embodiment, the first field associated with every NDE is its name, a character string with an implementation dependent maximum length. The "name" references a NDE located in the Coordination Namespace. The "name" can simply be the first field, the name, a search template for any set of the fields in the NDE, and the like and referenced herein as a "name," a "key," or as a "NDE-name." The Coordination Namespace allows access to NDEs contained within a distributed object store. As shown in FIG. 2, peer-to-peer messaging over network links 175 across network 99 is used for accessing remote NDEs (tuples). In an embodiment, network 99 is a combination of the intra-node network 13 and inter-node network 20 of FIG. 1.

In embodiments, each unit contributing storage is an owner of a set of "groups" segments of the Hash of the "name". CNS storage can be located in system memory or a Storage Class Memory (SCM), or in a File System. The CNS is accessed using software commands 225 received via an application programming interface (API) 230 and forwarded to the CNS controller 300. The CNS controller is completely implemented in software if CNS storage is file system based.

The extended memory architecture uses NDEs or "tuples" within the Coordination Namespace system architecture 100 to communicate work between applications. In order to manage the Coordination Namespace, the system may also be associated with a CNS server that manages a Coordination Namespace located in a distributed manner across all or subset of the memory elements of the system. The part of the memory of the system associated with the Coordination Namespace is referred to as the Coordination Namespace memory 200. Parts of this memory may be in the nodes executing the applications, other parts may be in memory dedicated to the coordination namespace. The Coordination Namespace addresses the challenges of moving data between phases of a workflow by providing an efficient means for communication between and coordination of the applications within a workflow. In addition, the Coordination Namespace also addresses the need for keeping certain types of data persistent in memory longer than the duration of a single program or application.

In FIG. 2, one of the CNS controller elements 300 is CNS Server used for accessing the Coordination Namespace memory. The CNS server in particular manages the Coordination Namespace located in a distributed manner across all nodes (each node can have its own CNS server, CNS client, or both) of the system contributing to the distributed memory. A node may contribute all its memory to the Coordination Namespace (node is a dedicated CNS Server), parts of its memory or none of its memory. A node may still access the Coordination Namespace 200 even if not contributing any of its memory. The parts of the memory of the system associated with the Coordination Namespace may also be referred to as the Coordination Namespace memory or distributed memory. Various NDEs, such as NDE 280 and NDE 281 may be located in the distributed memory. In order to process Coordination Namespace Requests such as creating and reading NDEs a hashing of a named data element name (key) at a requesting client yields information about the node at which the named data element is located. This provides a single hop mechanism to locate an NDE.

In an embodiment, CNS Server characteristics include the use of a Hash table to manage tuples owned or naturally homed. In embodiments, a single hash table is provided per CNS node. Additionally, as multiple coordination namespaces can run concurrently on a node, there is more than one hash table per CNS node, Each unit has independent hash tables. There is further provided a Tuple memory in storage class memory and CNS data structures in a CNS Controller DDR. A CNS server uses a virtual address space local to the unit for accessing Tuples storage.

A CNS client is provisioned with request queues for locally initiated commands with one queue per process (e.g., allowing access to any open CNS).

In embodiments, example access methods provided by the extended memory architecture include, but are not limited to: (1) Direct load/store access to memory located within a node. (2) An asynchronous copy method. (3) A NDE access method. The NDE access method provides a set of commands to create, read, retrieve, and destroy NDEs in the Coordination Namespace.

When accessing the Coordination Namespace, the CNS controller (e.g., Client or Server) applies a distributed hash function on the NDE-name to locate the data and perform the data movement. A CNS Server allows access to NDEs in a distributed system in a similar way as load-store instructions in an instruction set allows access to locations in a virtual address space. Furthermore, these NDEs are located beyond an application's virtual address space. NDEs and data in the Global Virtual Address Space may persist beyond the tenure of the application.

In embodiments, each node 12 of EM 10 includes components running methods disclosed herein for implementing operations to observe the creation and deletion of the tuple record(meta data), and notify a process of tuple creation/deletion including a setting up notification of a tuple record before it is even created in a coordinated namespace (CNS) extended memory system 100.

Figure 3:
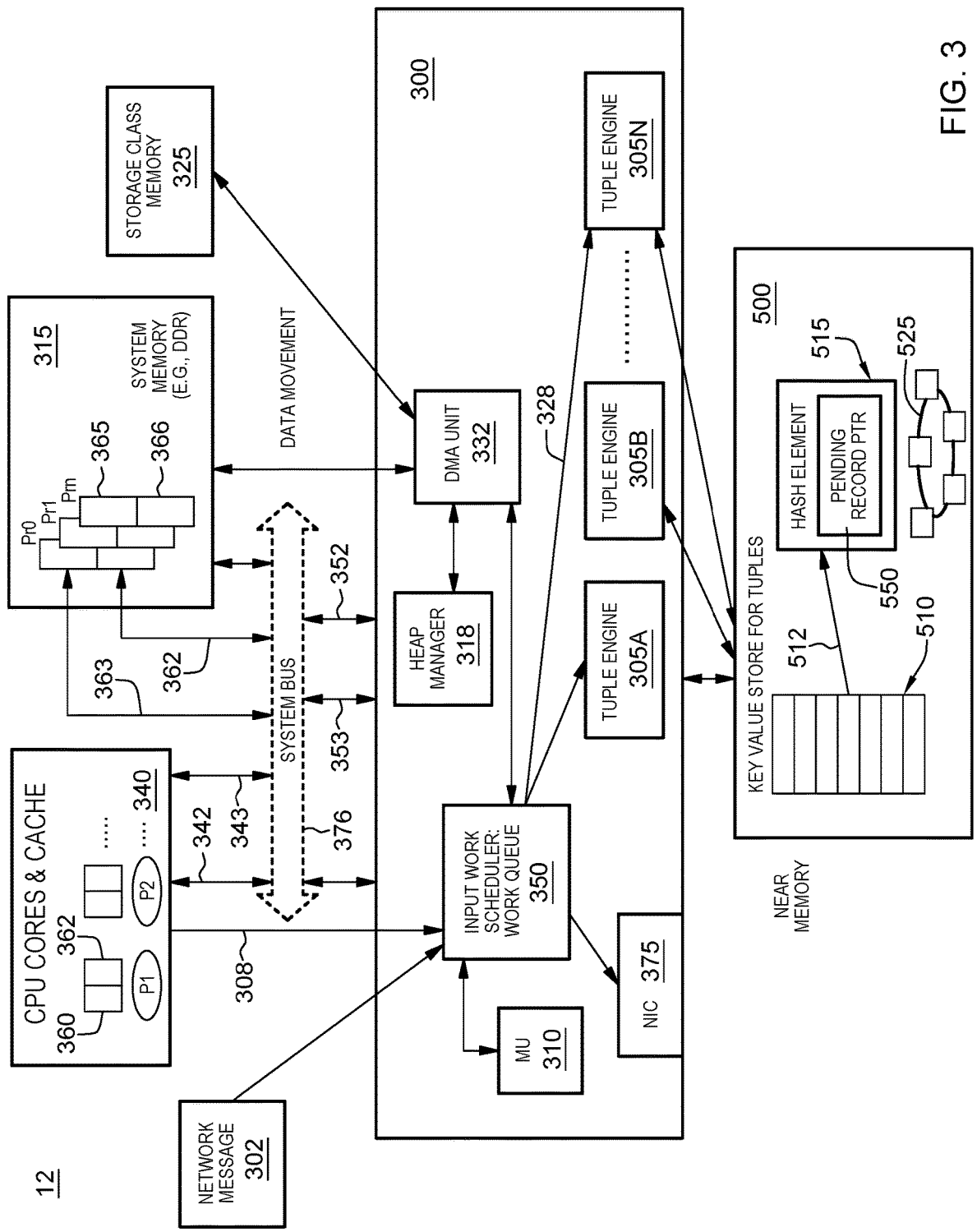
FIG. 3 schematically depicts a high-level schematic of a CNS controller for managing tuples (NDEs) in the coordinated namespace system of FIG. 2 implementing tuple notification operations.

FIG. 3 schematically depicts a high-level schematic of a CNS controller 300 at a processing node 12 for managing the observing the creation and deletion of the tuple record (meta data), and notify a process of tuple creation/deletion in the coordinated namespace system 200 of FIG. 2 to implement tuple processing relating to notifying processes in the multi-node computing system. In embodiments, the controller 300 is a hardware FPGA implementation and is seen as an accelerator to process the requests offloaded by a CPU 340.

In FIG. 3, CNS controller 300 at a node 12 includes one or more tuple engines 305A, 305B, . . . , 305N which are hardware units providing the processing to perform searches for tuples or create/delete tuples as needed in a near memory structure 500 (e.g., a local DDR memory). The tuple engine performs a hash of the tuple name to locate the node designated as the natural home. In embodiments, tuple engines respond to commands issued by work manager/scheduler 350. In an embodiment, each tuple engine is responsive to a received API request, determines whether a hash element and a tuple record associated with the specified tuple name exists and, if a tuple record exists, retrieves tuple record/data and returns the data to a requesting process. A completion record is sent back to the requesting process following the data retrieval. Otherwise, it will create a new hash element for the specified tuple name and create a pending record for for association with that hash element by linking the pending record to a circular doubly linked structure of local tuples.

Each tuple engine hardware unit 305A, 305B, . . . , 305N updates local DDR data structure 510, HE, PR, LT, and RT. Further, each tuple engine: supports pending records processing as it pertains to observing the creation and deletion of the tuple record(meta data), and notifying a process of tuple creation/deletion by another process in the coordinated namespace (CNS) system 100. That is, apart from creating/ searching/deleting a hash element and/or tuple record—the tuple engine further observes the creation and deletion of the tuple record(meta data) and notifies a process of tuple creation/deletion. In embodiments, this functionality includes setting up notification of a tuple record before it is even created in the CNS system.

In an embodiment, near memory 500 can be a separate DRAM memory that has lower latency with respect to the tuple engines or it can be a partition within a system memory 315. The storage class memory 325 can also be another partition within system memory. A Heap manager element 318 is invoked to allocate/free memory in storage class memory.

In an embodiment, the work manager/scheduler 350 receives/processes software requests 308 (i.e., CNS opcodes) issued by CNS server and/or CNS client processes, e.g., CPU cores, and issues new work to the different Tuple processing engines 305A, 305B, . . . , 305N over a ring/bus structure or multiplexor 328. The work requests may be queued in an associated WQ (not shown).

In embodiments, near memory 500 can be a RAM (e.g., DDR3) that stores a hash table 510 that, instead of hash array element values, contain pointers, such as head pointer 512 that points to a first HE 515 and a linked list structure 525 that record the location of tuples or pending requests waiting for tuples. Such a linked list structure 525 may be pointed to by a pending record pointer 550 included in hash element 515. Tuple engines 305A, 305B, 305N traverse the hash table 510 and linked list structures 525 to search, insert or delete tuple records. By calculating the hash of a tuple name, there is provided an index into the table 510 which provides the head of the linked list (i.e. the first item in each list 525 of tuple records).

A direct memory access (DMA) memory processing unit 332 is configured to move data between the system memory and storage class memory. DMA unit 332 further enables the various CNS controller hardware components to access system memory (random-access memory) 315 and/or storage class memory 325 and enable transfer of tuple data between storage, SCM and near memory 400 or vice versa independent of any central processing unit (CPU).

A messaging unit 310 is implemented for supporting the message structure for multi-node operations to observe the creation and deletion of the tuple record(meta data) and notify a client process of a tuple's creation/deletion.

A network interface card (NIC) 375 is provided that interfaces the CNS controller unit 300 to an external network for inter-node communications. For instance, notification messages may be sent by the CNS controller via the NIC 375 over a network to a notify queue 360 and a monitoring queue 362 associated with each process at computing nodes in response to when the tuple record(s) the process has previously read is(are) attempted to be removed and/or modified from the coordination namespace by other processes. When a process wants to be notified about changes to a tuple in the coordination namespace, it puts and entry for it in the monitoring queue and notifies the CNS controller that it needs to be notified on removal/changes to the particular tuple. When another process attempt to remove/add a tuple by that name, the CNS controller sends a notification to the process that requested notification. This notification is placed in the notify queue. The process then compares the notification entry with what is in its monitor queue and makes a determination if it needs to take further action on the tuple.

In embodiments, work manager element 350 receives the CNS software requests (e.g., opcode) 308 from master and client processes running on CPU and caches 340, and keeps track of the creation and deletion of the tuple record(meta data), and notify a client process of tuple creation/deletion including a setting up notification of a tuple record before its even created in the CNS system. In an embodiment, the work manager 350 can receive request messages, e.g., tuple commands 302, over the network from other nodes relating to process notify operations. The work manager 350 implements process for notifying DMA unit 332 to transfer tuple data depending on the CNS opcode being processed.

Further included as part of the system memory 315 in the CNS node architecture 12 is a request queue 365 in which processes write a request, and a completion queue 366 which are created at the start of the coordination namespace system. A single request queue and completion queue is provided for each user process, e.g., processes labeled pr0, pr1, ..., prn. In an embodiment, the completion queue 366 is placed consecutively after the request queue 365 array in system memory.

In an embodiment, user processes running in a CPU core 340 issues write commands to a request queue via system bus 376 providing data transfer amongst the CPU, system memory and CNS hardware controller 300. As the CNS controller hardware may not know about this new request being inserted in system memory, the process performs writing to a memory mapped IO address (MMIO address) a value—which could be the updated tail pointer of the queue that contains the request. The hardware monitors the MMIO bus and upon seeing an address belonging to it—and the corresponding value that came with the address—it compares the value with its known head pointer of the queue. If the new tail is greater than the head—then it knows that a new request has been inserted in the queue. It then proceeds to issue a load on the address corresponding to the tail pointer. If tail pointer was incremented by more than 1—then hardware loads head ptr +1, until it reaches tail of the queue. The MMIO bus carries data in packet of multiple beats. The first beat would have the address of the MMIO, and the subsequent beats have the data associated with the address.

Thus, every time a user process issues a request message 342 into the request queue 365—a MMIO doorbell is rung to the hardware for processing. Via messaging 353, 363 over a system bus, the CNS hardware controller 300 picks this request from the request queue 365 and processes it while the user process waits for the processing to complete. When the hardware/controller completes processing the request, it issues a completion notification message 352, 362 into this completion queue 366 for that process. The user program/ processes further polls 343 via the system bus 376, this completion queue 366 for new completions. When it finds one, it clears the corresponding request from the request queue. The completion entry in the completion queue informs the user process which request got completed and some status and error messages. In an embodiment, the aggregate value from tuple reduce operations could also be included in this completion message, or it could have been in a predefined location that was indicated in the original request. The user process picks the value from this predefined location. The hardware has updated the aggregation value at this predefined location as part of its processing.

Figure 4:
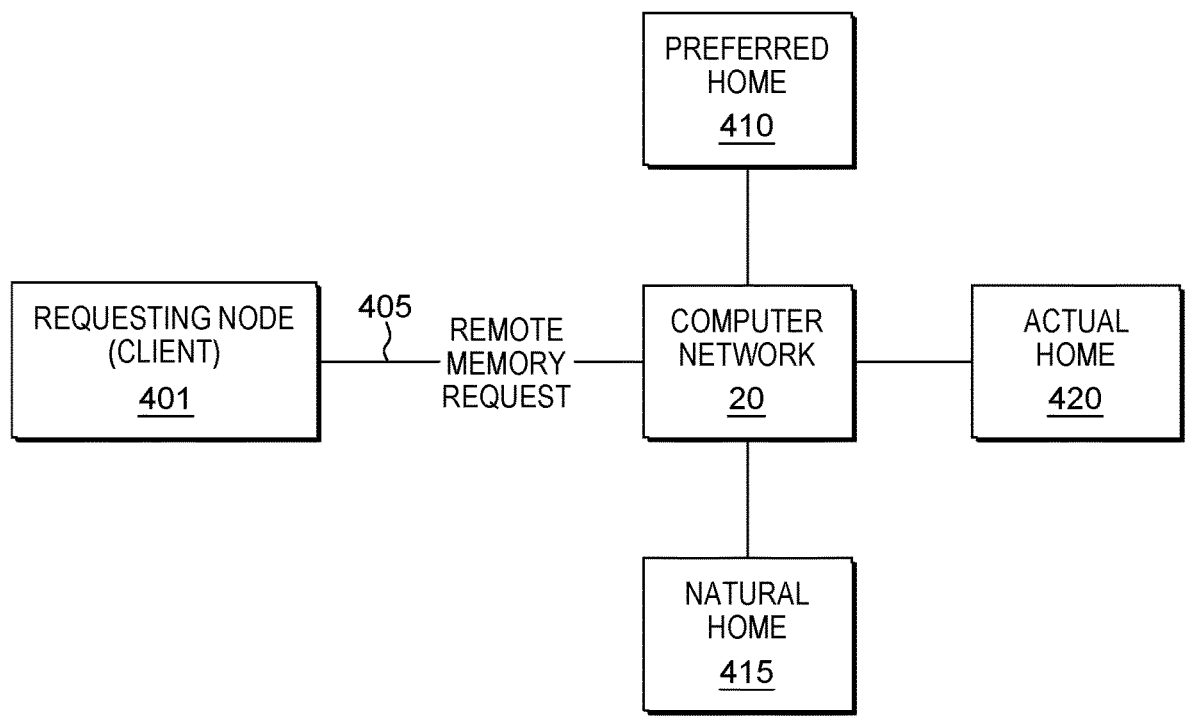
FIG. 4 shows a diagram depicting the homing of a tuple in a Coordination Namespace (CNS)

FIG. 4 shows a diagram 400 depicting the homing of a tuple in a Coordination Namespace (CNS). With respect to running a workflow or application, a requesting Node (e.g., client 401) is the location running the process making the remote memory NDE request 405, i.e., the unit 15 making the tuple command, e.g., including the tuple key or "name".

At the CNS controller, the hash algorithm is applied to the tuple-name to identify the Natural Home 410. The Natural Home directly or indirectly indicates the node where the NDE is created or may be found if no other information is provided. The Preferred Home 415 may be provided by the process making the request or by prediction algorithm, e.g. running at the CNS client, for example, by an affinity parameter. The preferred home node can be a desired location, e.g., specified by a user. When supplied, the Preferred Home 415 directly or indirectly indicates the node where the NDE should be created or where to first search for the NDE. The Actual Home 420 identifies the node where the NDE resides. When creating a NDE, the Preferred Home (node) is tried first. If the tuple cannot be created there for some reason, such as out of memory an alternate home is chosen, and that node becomes the Actual Home. When a NDE is created, the Natural Home 410 always keeps a record in the local hash table indicating the Actual Home but does not store the data. In embodiments, a PH could also be the tuple's natural home (based on the hash of the name). The Natural home node will always receive the tuple based on its key hash and make and add an entry in it. When a NDE is requested, the hash table on the Preferred Home (node) 415 is searched first. If the NDE is not found, the request is sent to the Natural Home for recording the dummy pointers for the associated key. The nodes identified by the Natural, Actual, and Preferred Homes can all be different, the same, or any combination. In addition, they can also be different or the same as the requesting node. The communication between the requesting node, the Natural Home, the Preferred Home, and the Actual Home is performed via a the inter-node Network 20.

Figure 5:
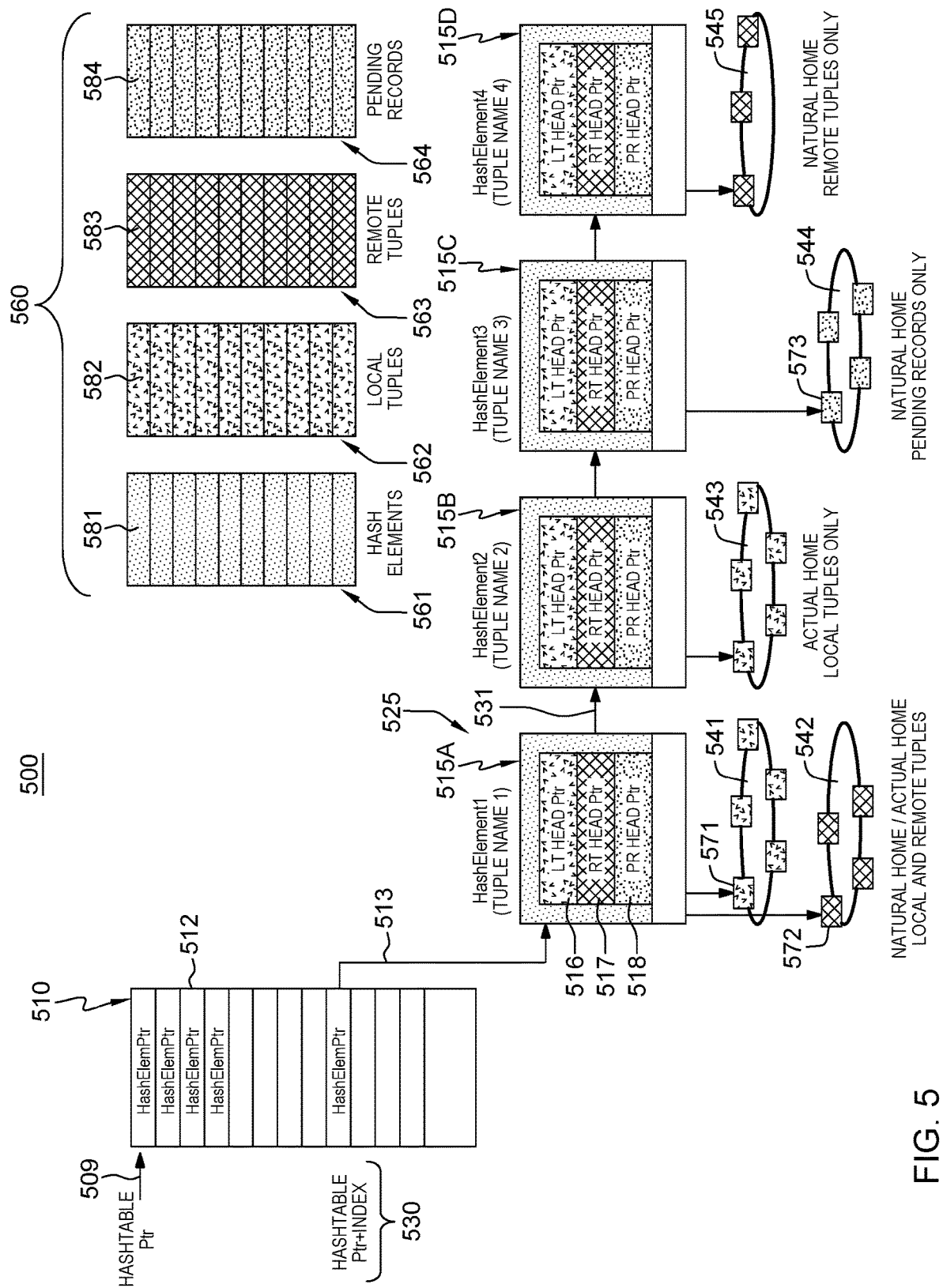
FIG. 5 depicts in greater detail the DDR hash structures in a near, or a partition in system memory implemented in CNS memory at a distributed node.

FIG. 5 depicts an implementation of a DDR hash structure(s) in a near memory 500 (e.g. dynamic RAM (DRAM) memory or double data rate RAM (DDR)) or a partition in system memory, used for hardware support of the tuple checkout and process notification operations in the coordinated namespace architecture. In embodiments, the nodes 12 include a local or near memory of the CNS extended memory architecture.

As shown in FIG. 5 a unit 500 provides the hash table 510 in the dynamic RAM (DRAM) memory or a DDR memory, with the hash table 510 containing fixed size structures in the form of a hash table map including hash element pointer entries 512, that point to a corresponding linked list array structure 525 maintaining a linked list of pointers to various types of tuples (e.g., LT, RT and PR) stored at memory locations in the CNS extended memory. In particular, a tuple pointer (HashElemPtr) 512 points to a head pointer of the linked list 525.

In an embodiment, the hash table 510 is initially accessed by a pointer 509 based on a part of the hash value of a tuple name of a received sorting operation tuple command. The hash table map data structure 510 implements a hash function to further compute from the hash value of the tuple name a pointer index 530 for accessing a particular memory pointer element in the table 510 of memory pointers. The hash element contains the key of a tuple key-value pair. While multiple tuple keys or "names" can hash to a same index, they are linked as a linked list 525 of hash elements 515 in a linked list structure 525.

For example, as shown in FIG. 5, a HashElemPtr memory pointer 513 points to a first hash memory element, i.e., a first element 515A of a linked list 525 of tuple storage locations in memory 500 which can be used for memory read or write operations in the CNS extended memory. That is, instead of each hash array element values, each item in the hash table map data structure 510 is simply the head pointer 513 to a first hash element item in a linked list 525. By calculating the hash of the received tuple name, there is provided an index 530 into the array table—which in provides the head 513 of the linked list (i.e. the first item in linked list 525).

In embodiments, each hash element 515 in that linked list 525 would correspond to a unique tuple name, and it is possible to have multiple tuples for the same name, i.e., each hash element 515 is searched to find a tuple name (1 per hash element) and within each hash element 515 is three lists: list of local tuples (actually stored on that node), a list of remote tuples (if the node is NH for that name), a list of tuples that are known that exist somewhere else, and in an event that a request for the tuple came before the data is actually provided, e.g., by receiving an CNS "IN" opcode prior to receiving an CNS "OUT" opcode, the request is saved in a pending record. Each linked list 525 is a linked list of hash elements, with each hash element 515 including one or more of: a pointer 516 to connect to the local tuple(s) list, a pointer 517 to connect to a respective linked list structure of remote tuple(s), and/or a pointer 518 to connect to a respective linked list structure of pending record(s) all for the same tuple name, as well as a next pointer 531 to a following hash element 515 in that linked list 525. Linked list 525 includes tuples that hash to the same Hash Table index where each element in the list corresponds to a unique tuple name.

Each of the local tuples/remote tuples/pending records connected to the given hash element 515 are connected themselves as circular doubly linked structures. Thus, as shown in FIG. 5, there are three (3) possible combination of allocation of tuple records in memory 500 as circular doubly linked structures including: 1) a circular doubly linked list structure 541 of local tuples for a given unique name stored in memory allocated on the node (including NH and AH tuples) as pointed to by hash element 515A; 2) a circular doubly linked list structure 542 of remote tuples for a given unique name that are NH on the node and pointed to by hash element 515A, but the data is actually stored on a different node; and 3) a circular doubly linked list structure 544 of pending requests for NH tuples of a given unique name that have not been created (e.g., only pending records present for a given tuple—indicated for the natural home as pending records (PR) cannot be present in actual homes). As shown in FIG. 5, a circular doubly linked structure 543 is formed with only local tuples present—indicating for actual home local tuples only as pointed to by pointer in hash element 515. Further, a circular doubly linked list structure 545 of only remote tuples if only remote tuple list is present for a given tuple name—its the natural home for that tuple, as pointed to by pointer in hash element 515D. In additional embodiments, a combination such as a NH=AH can exist such that both LT list and RT list would be maintained in the same node (e.g., both the natural home and actual home for the tuple), e.g., as pointed to by pointers in hash element 515A.

Thus, as further shown in FIG. 5, the LT head pointer 516 of hashelement1 515A associated with a first tuple name points to a head 571 of double-linked circular list structure 541 of local tuples and the RT head pointer 517 of hashelement1 515A associated with a first tuple name can point to a head 572 of double-linked circular list structure 542 of remote tuples. Similarly, the PR head pointer 518 of hashelement1 515C associated with a third tuple name points to a head 573 of double-linked circular list structure 544 of pending records. It is understood that a head tuple of the pointers can represent a new hash element taken from free pointer list memory buffers 560 to record a first open tuple element for that name responsive to a CSOut( ) tuple command without a corresponding entry in hash table 510. When the hash table is searched, and a hash element is already found for the processed tuple name, then the linked list structure is formed by appending a new record for commands received for that same tuple name.

In an embodiment, as shown in FIG. 5, at a node, the data value part of the tuple is stored in near memory and are pointed to by a data pointer field in the created tuple record. The local tuples themselves are pointed to by a pointer as indexed in the hash element corresponding to the tuple name in the CNS structure at a node shown in FIG. 5. Using a local DRAM memory, there is locally stored tuple values. If data size is small, e.g., on the order of 64 bits, performance is improved by storing this tuple value data locally within the local tuple itself in the form of immediate data.

Further, as shown in FIG. 5, there are corresponding four (4) types of free list memory buffers 560—one for each type that is needed to form these linked list structures 541, 542, and 544 and one for the linked list of hash element 525 where a hash element is for each unique name that hashes to a hash table index. In an embodiment, a tuple engine traverses the hash table based on a received tuple name and accesses the linked list structures to search, insert or delete tuple records. When a tuple engine needs to create an entry in these linked structures—the tuple engine retrieves a new element from the free list 560 corresponding to the linked structure type. As shown in FIG. 5, a tuple engine can pick an entry for a linked list structure from free lists associated with hash element type 561, local tuples type 562, remote tuples type 563 and pending records type 564.

In embodiments, fields for the linked list associated with hash element type 561 include a head of linked lists for local, remote and pending tuple records. In an embodiment, the CNS controller contains a head pointer for each free list type: hash element, local tuple, remote tuple, and pending records. Each element in the free list include a set of pointers linking together the free elements. For example, free list element 581 associated with hash element type 561 include: a set of pointers, e.g., a pointer to address of next HashElem, a pointer to an address of a previous HashElem, an address of a HashTable parent (i.e., the hash index), and head pointers for each type of tuple record linked list, e.g., pointer to an address of a first element in PendingReq list (pending request), pointer to an address of a first element in LocalTuple list, and pointer to an address of a first element in RemoteTuple list of that tuple name, etc. When a tuple engine needs a new hash element for an NDE, it removes the first free hash element 581 and adds the element to the linked list 525. The tuple engine then removes the first free tuple record type required (e.g., 582, 583, 584) and fills in associated pointer in the new hash element, e.g., 515A, thus creating a tuple record for the new NDE.

Further, the fields 582 in free lists associated with Local Tuples type 562 include information for creating the linked list. For example, for LT linked list 541: fields include a pointer to a tuple address in SCM a pointer to an address of the next LocalTuple, a pointer to an address of a previous LocalTuple, a pointer to an address of a HashElem parent, etc. Additional information is provided including information needed to recreate the pending request for the tuple when the tuple is created, e.g., an address of actual tuple, a size of the actual tuple, and a pointer to an address of the NH RemoteTuple.

Further, the fields 583 in free lists associated with Remote Tuples type 563 include information for creating the linked list. For example, for RT linked list 542: fields include a pointer to details of actual home of tuple and location of tuple record in home hash table structure including: address of the next RemoteTuple, an address of a previous RemoteTuple, an address of a HashElem parent, an actual home unit of tuple, and an address of LocalTuple at home.

Further, the fields 584 in free lists associated with Pending Records type 564 include information to recreate the original request into a work queue including: address of the next PendingReq, an address of previous PendingReq, an address of HashElem parent, etc. Additional information is provided including information needed to recreate the pending request for the tuple when the tuple is created including: a Requesting unit, a Requesting pid (process identifier) to facilitate memory address translations between effective address to real/physical addresses, a Requesting address, a Requesting size, a Requesting queue tag and a Request type (RD/IN).

Although not depicted, in a further embodiment, CNS controllers send commands between controllers when processing a tuple request.

For example Coordination Namespace APIs are provided with one coordination namespace access API is csOut( ) which is a command sent from a requesting unit to a NH or PH to take the tuple from requestor and store it, i.e., create it, in the CNS. A csIn( ) is a command sent from a requesting unit to a NH or PH to retrieve the tuple from CNS and store it in the requestor node (i.e., and removing the tuple from CNS).

For a tuple read, the coordination namespace API is structured as csRd(cs,tuplename,group,returntag) where "cs" is coordination namespace handle, "tuplename" is a tuple name (key or keyname), "group" is the unit/node where the user suggests to look for the tuple first, and the "returntag" parameter enables identifying the request when a response is sent back by the CNS controller to the process.

In accordance with an embodiment for tuple process checkout with notification, the coordination namespace API command sent from a requesting unit to an AH is structured according to:

csRd_withnotify(cs,tuplename,group,returntag,notifytype)

where the Notifytype=type "1" or type "2", where type 1 indicates a first type of notification indicating the CNS controller to embed a special pending notify pointer in the hash element for that tuple name for process notification, and type 2 indicating the CNS controller to create a pending record in the CNS with a pointer link to a pending notify record, created to inform the CNS controller of the process to be notified in the event of a tuple creation or deletion as described herein with respect to FIGS. 6A, 6B and 7-10.

In embodiments, when a requesting node 401 issues a software API "csOut( )" (hardware opcode=csout), the process at the node is requesting creation of a new tuple in the CNS, e.g., taking the tuple from request to store in CNS system 200 as described as follows:

The processing of the csOut( ) command message to create a tuple for storage at a node include steps of: receiving, at a node from a requesting node, a User Req csOut, and in response, checking at the workload scheduler whether the node is the preferred home for the tuple, e.g., check if node=preferred home. If the node receiving the csOut( ) command is not the preferred home, then the messaging unit sends the csOut( ) message to the preferred home for processing that tuple. If the node receiving the csOut( ) command is the preferred home, then the tuple engine at the node will check the hash of the tuple name and compute a hash entry address. Further the tuple engine at the receiving node issues a Read head pointer in the Hash table and searches or scans any associated hash element linked list structure for the corresponding entry in the DDR memory 500 to determine whether a tuple had been created for that tuple name.

The tuple engine will further check the response received from the DDR memory on board the FPGA unit 500, or alternatively, the system memory or any near memory which is faster/lower latency than the storage class memory, compute a next address of hash element and issue a Read hash element. Further, the tuple engine will check the DDR response, check the tuple name in hash element; and determine whether the tuple name matches the request. This process of computing next hash element address, reading the hash element and determining whether the tuple name has been created in a hash element is repeated continuously until reaching the end of the linked list structure.

That is, as long as the tuple name of hash element linked list structures does not match the request, then the tuple engine will obtain the head of local tuple list and issue a DDR read request for first local tuple. Then, the tuple engine gets the next pointer of retrieved tuple, and issues a DDR read request for next local tuple in list. The process of reading from the DDR is repeated until the last element of the linked list is read.

If, while traversing the linked list structure, it is determined that no tuple (hash element) has been created to match the tuple name requested, a new hash element is retrieved from the free pointer list and it is inserted into the list and a first record of the tuple name is created as a tuple hash element. The tuple engine will then obtain a free element for a local tuple record, update the local tuple head pointer with the newly obtained free element, and update the new tuple record with the location of data in the SCM. The tuple engine then completes processing, notifies the work scheduler/user of the completion and notifies the Natural Home of new record.

Upon scanning by the tuple engine, if a tuple hash element has already been created for the received tuple name in the linked list indicated in the csOut( ) request, then a new record is created in the associated linked list structure for that hash element.

In embodiments, the requesting node can issue a software API "csIn( )" (hardware opcode=csin) which is invoked to retrieve and remove a matching tuple from CNS. In CNS processing of the csIn( ) command at a node can include steps of: receiving, at a node, a User Req csIn, and in response, checking at the workload scheduler whether the node is the preferred home for the tuple, e.g., check if node=preferred home. If the node receiving the csIn( ) command is not the preferred home, then the messaging unit sends the message to the preferred home for processing thereat. If the node receiving the csIn( ) command is the preferred home, then the tuple engine at the node will check the hash of the tuple and compute a hash entry address. Further the tuple engine at the receiving node issues a Read head pointer in the Hash table and search for the corresponding entry in DDR memory. In an embodiment, if the tuple record is not found in preferred home, then this request gets sent to the natural home where information on the tuple record will be found if the tuple exists. This might be in the form of a remote tuple record that informs where the actual home is for the tuple. If not found, it becomes a pending request record.

The tuple engine will further check the response received from a memory controller of the DDR memory, compute a next address of hash element and issue a Read hash element. Further, the tuple engine will check the DDR response, check the tuple name in hash element; and determine whether the tuple name matches the request.

If the tuple name does not match the request, then the tuple engine will continue to search the linked list for a matching tuple.

If the tuple name does match the request, then the tuple engine will obtain the head of local tuple list and issue a DDR read request for first local tuple. Then, the tuple engine performs removing the element from linked list, updating the hash element to point to next element in list, and delete the Hash element if it was last element.

The tuple engine then informs a local memory using a direct memory access (DMA) request, to transfer data from the SCM to the local memory. Then a command is issued to update the natural home in response to the removing the tuple. Then, the tuple engine completes processing and notifies work scheduler/user of the completion.

In an embodiment, a csIN/csRD tuple command received before a csOUT will result in creating a pending record for csIN/csRD for association with that hash element. The pending records are resolved when csOUT for that tuple name is issued. When the csOUT is received, the csIN/csRD completes.

The extended memory architecture 10 of FIG. 1 provides a hardware and software accelerated mechanism to support operations responsive to the removing or updating of a tuple record for notifying one or more operating processes owning that tuple that run in a distributed multi-node computing system implementing a CNS namespace architecture.

In an embodiment, system and methods are implemented by a CNS controller at a node to detect an instance when a tuple data is created/read by a first process, e.g., a process 1 (P1) shown in FIG. 3, issuing a csIn( ) or csRD( ) command, and further detect when a second process, e.g., process 2 (P2) shown in FIG. 3, issues a csIn( ) to read and remove the tuple or possibly modify it by reinserting a new data value. Upon the detecting and prior to processing the tuple remove/update requested by process P2, the CNS controller issues a message to process 1 to notify process 1 of the update or removal. This way process 1 can decide to retrieve the tuple record again. This processing may be repeated for notifying further processes that have read the tuple previously and requested notification that the tuple record is being modified so each process can receive the notification.

Figure 6A:
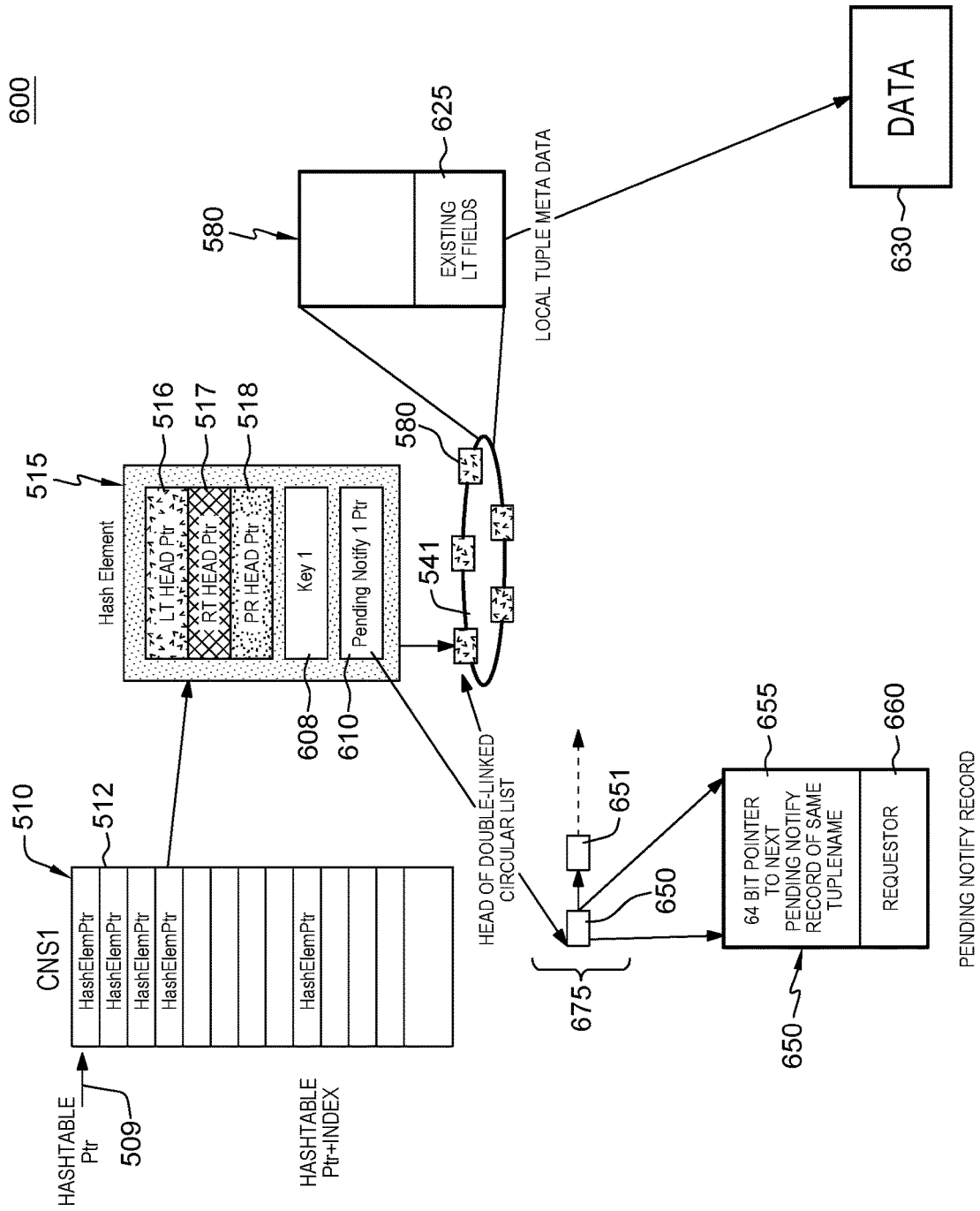
FIG. 6A depicts in greater detail the DDR hash structures in a near, or a partition in system memory implemented when performing a type "1" process notification upon an update or removal of tuples in an embodiment.

FIG. 6A depicts a status of an example CNS hardware support system 600 in which a first Named Data element, e.g., tuple record 580 having local tuple metadata and a pointer 625 to stored data, has been created for a first tuple name, "Key 1" 608 as requested by a local process in accordance with the system of FIG. 5. A local process can be any requesting process running at any of the system of nodes across which the CNS is running. As shown in FIG. 6A, the CNS architecture provides hardware support system 600 for efficiently notifying the local and/or any remote process owning a tuple when that tuple has been read and/or updated/removed by another process running in the CNS architecture. For the process notification, the CNS architecture provides for a method of communication which involves participation of many nodes (all processes) in a communicator.

As shown in the system 600 of FIG. 6A, in support of tuple checkout with notifying operations, the tuple engine at the CNS controller observes the creation and deletion of the tuple record(meta data), and responsively notifies a process, e.g., process 1, of tuple creation/deletion including a setting up notification of a tuple record before it is even created in a coordinated namespace (CNS) extended memory system 100.

In particular, for Type 1 processing in which a requesting process issues a csRd_withnotify(cs,tuplename,group,returntag,notifytype) where the Notifytype=type "1", the CNS controller responds by embedding a special pending notify pointer field 610 in the hash element 515 associated with that tuple name. The CNS controller further creates a pending notify record 650 in the near memory of the distributed memory system. The pending notify pointer field 610 includes a pointer added to and maintained in the hash element 515 for pointing to the specific created pending record 650 for process notification. In an embodiment, multiple processes can request to be notified on a tuple removal/creation/modification. Each request creates a pending notify record that is added to the linked list 675 of pending notify records.

As shown in FIG. 6A, responsive to the received csRd_withnotify( ) request, in a first embodiment, an actual home of the tuple containing the tuple record 580 is used to store the pending notify pointer 610 that points to a pending notify record 650 created by the CNS controller. In an embodiment, pending notify record 650 includes metadata content 660 including requestor information of the requesting process (e.g., an address location of process P1) for indicating to the CNS controller of an expectation that the process, e.g. the process P1, is expected to receive a notification due to any subsequent activity to remove/modify the tuple data by another process, e.g., a process P2, that is sharing the tuple or tuple record.

In one embodiment, when the Notifytype parameter is set to type "1", the CNS controller responds by embedding in the hash element 515 the pending notify pointer 610, e.g., a 64 bit pointer, to the pending notify record 650 stored in memory that is used to provide a notification to waiting processes of an addition or deletion of any tuple record for this tuple name (as there is a single hash element 515 for every tuple name). In an embodiment, in addition to the requesting process address information 660 and information of the node running the respective process, e.g., process P1, requesting the notification, the pending notify record 650 maintained by the CNS controller includes a next pointer 655 to a linked pending notify record. Type 1 notification tracks changes at hash element level on new tuples added/deleted. It is not monitoring specific tuple record.

In an embodiment, responsive to receiving several csRd_withnotify( ) requests for processes that indicate the same tuple name, the CNS controller further generates a pending notify list 675 that includes a linked list of pending notify records 650, 651, etc., each record having an address information 660 of a respective process requesting the notification should the corresponding tuple record or data be modified. The pending notify record 650 further includes a 64 bit next pointer 655 to the next pending notify record that was created by another process monitoring the same hash element.

In an embodiment, other processes may transact using the same tuple name and can request notification should the tuple record/data be modified or removed by another process. For each additional process requesting notification, the CNS controller will obtain information regarding the process id of each process and the request tag of the previous request that read this tuple, and will create a corresponding pending notify record. Each pending notify record is accumulated in a pending notification list 675 including a linked list of pending notify records associated with all processes requesting a notification based on actions involving a particular tuple name. Using the pending notification list 675, the CNS controller access the chain of processes indicated in each record of the list and notify each process when a tuple record/data is detected as being modified or removed by the CNS controller. That is, subsequent processes that issue the csRd_withnotify( ) request, will read the hash element 515 and the CNS controller, in response, will generate a respective pending notify record, 650, 651, etc., for each requesting process, and attach it to list 675. Thus, when any subsequent process is attempting to read and update or read and remove a tuple record, e.g., 580, then the CNS controller locates and obtains the pointer at the pending notify pointer field 610 of hash element 515 pointing to the first pending notify record 650 for this hash element type 1 notifications of pending notify record list 675. In an embodiment, the CNS controller iterates through each pending notification record of the pending notification list. That is, the CNS controller traverses each pending notify record 650, 651, etc., attached in the list 675. Each of these pending notify records are associated with different processes that requested monitoring the hash element. The record thus contains information of the process that made the request such as process identifier, a request tag of the request for reading this hash element tuple. The CNS controller knows the completion queue, notification queue of each process when the process attached to the CNS. This is contained in a process record table where information of every process currently attached to this CNS is stored. So the CNS controller can write back to the notification queue tail pointer which is a memory address in system memory, a notification record indicating the change in the hash element. Communications from the CNS controller to each process can be via a system bus (if the process is local) or over a network connection via the NIC. The respective process can choose to ignore or retrieve the new tuple information again after processing the notification event.

Figure 6B:
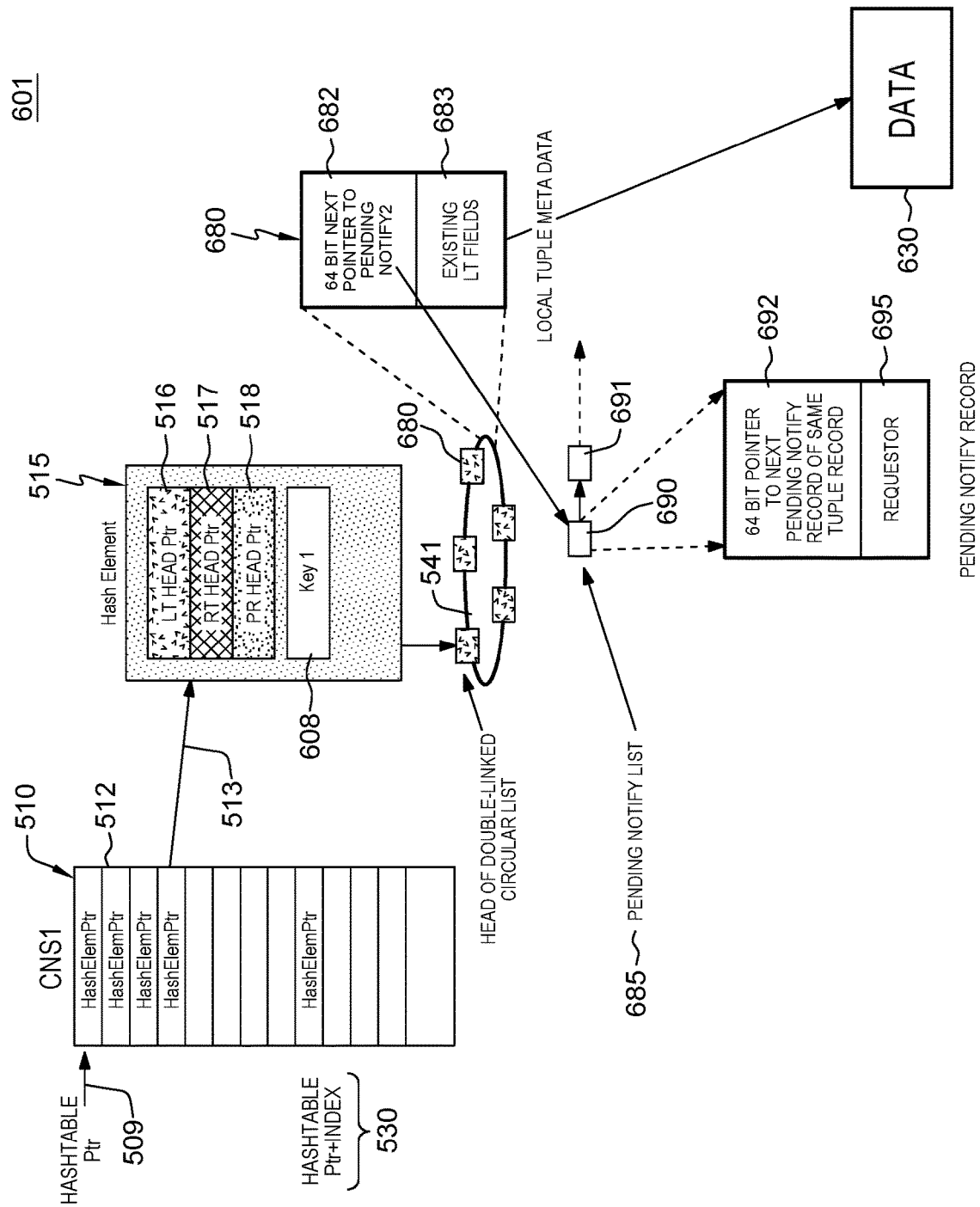
FIG. 6B depicts in greater detail the DDR hash structures in a near, or a partition in system memory implemented when performing a type "2" process notification upon an update or removal of tuples in an embodiment.

As shown in FIG. 6B, in an alternate embodiment, when the Notifytype parameter of the issued csRd_withnotify( ) request is set to type "2", the CNS controller responds by embedding in a tuple record, e.g., tuple record 680, the pending notify pointer, e.g., a 64 bit pointer, to the pending notify record stored in memory that is used to provide a notification to waiting processes of an addition or deletion of a specific tuple record for this tuple name. FIG. 6B further depicts the created tuple record 680 as including existing local tuple metadata 683 including local tuple fields pointing to data 630 stored in memory, and a pending notify pointer 682, e.g., a 64 bit pointer, on the actual tuple record 680 that points to a pending notify record 690, e.g., for process P1, only when the Notifytype parameter is set to type "2". This pending notify pointer 682 provides a notification of a deletion of that particular tuple record to all processes that are waiting on it.

Referring back to FIG. 3, in an embodiment, responsive to the received csRd_withnotify( ) request, the CNS controller 300 determines whether a hash element and a tuple record associated with the specified tuple name exists and, if a tuple record exists, retrieves tuple record/data and returns it to a process 1 (P1). Otherwise, it will create a new hash element 515 for the specified tuple name and create a pending record for for association with that hash element by linking the pending record to the circular doubly linked structure 541 of local tuples.

In one embodiment, when the csRD_withnotify API "Notifytype" parameter is set to type "1", the CNS controller responds by embedding in the hash element 515 a pending notify pointer 610, e.g., a 64 bit pointer, to the pending notify record 650 that is used to provide a notification to waiting processes of an addition or deletion of any tuple record for this tuple name (as there is a single hash element 515 for every tuple name).

Figure 7:
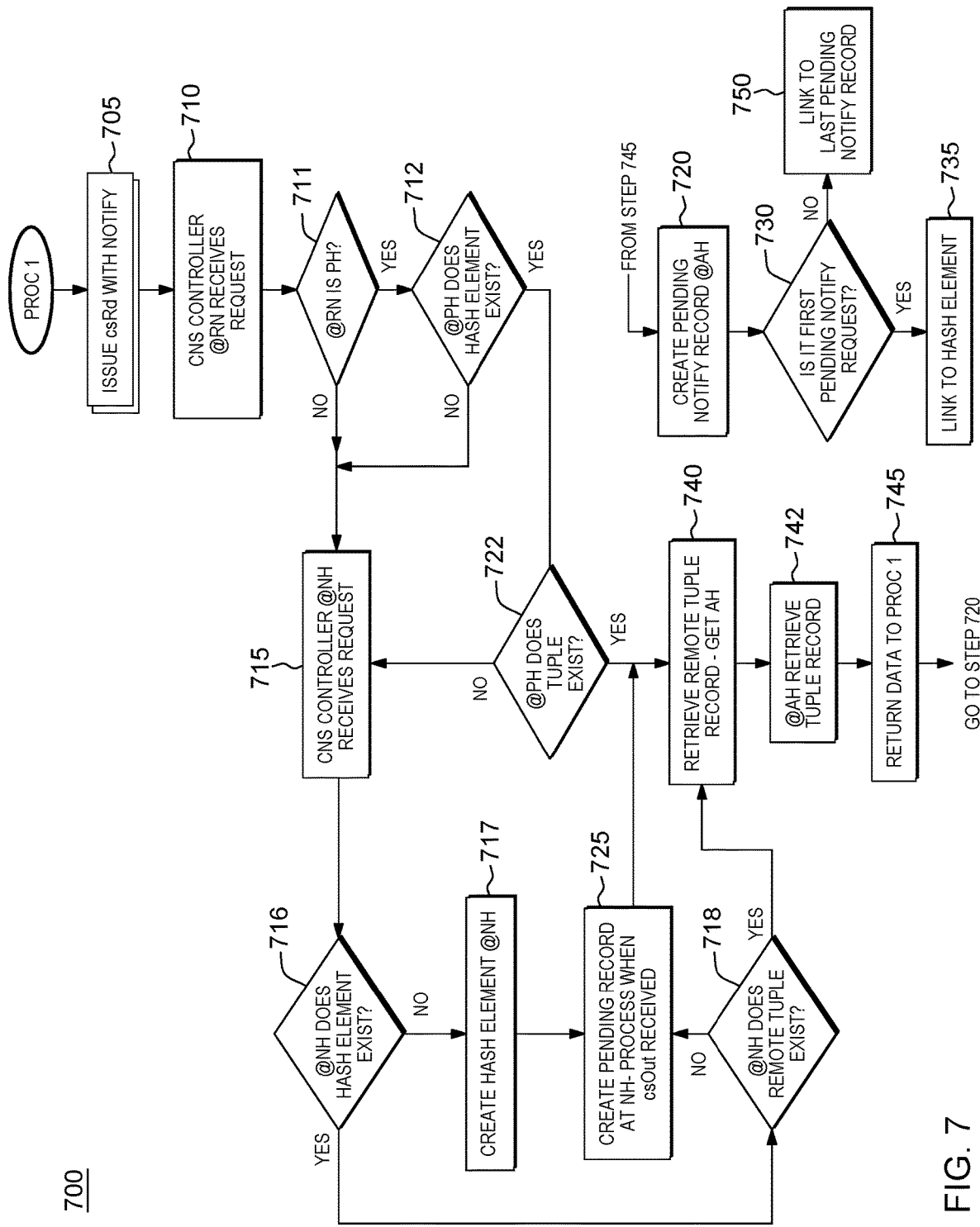
FIG. 7 generally depicts a method run at the CNS controller of a CNS system node responsive to receiving a csRD_withnotify( ) API request for performing a type "1" process notification in an embodiment.
Figure 8:
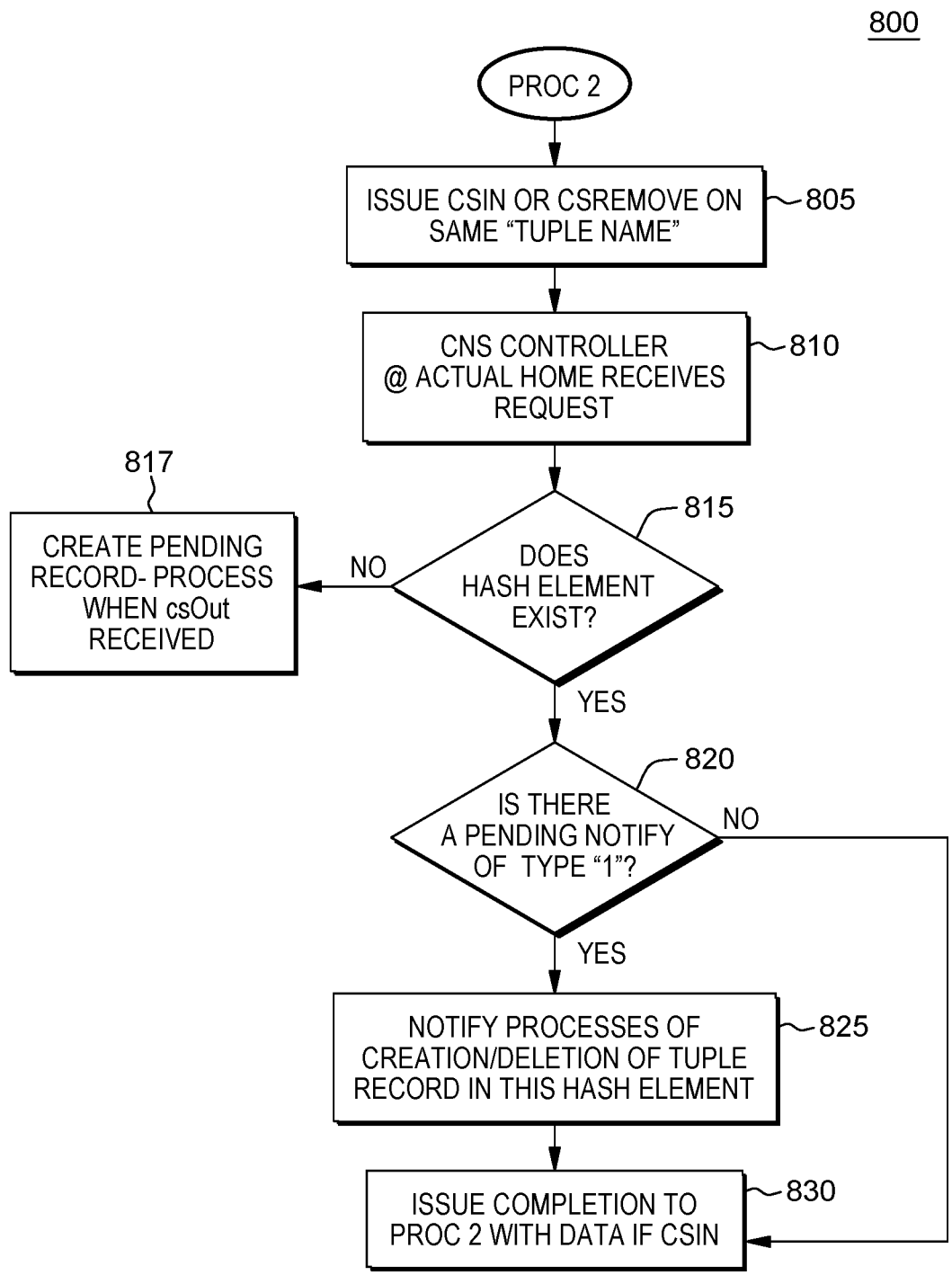
FIG. 8 depicts a method run at the CNS controller for notifying a subscribing process when a NDE has been created or removed and the notify type parameter is set to type "1"

FIGS. 7 and 8 depict a respective publication/subscription or "pub/sub"-type processing for tuple checkout with notification in the tuple space/CNS namespace architecture. In particular, FIG. 7 depicts a method 700 for notifying a process when an NDE has been created or removed and the Notifytype parameter is set to type="1". The method 700 includes a subscription process for enabling a process to be notified when the data of a tuple record it is monitoring becomes stale or is being modified or removed by another process, such that the subscribing process can decide whether to keep/use the tuple record's data content or to fetch a new copy.

In the method, at 705, the first process, e.g., Process 1, issues a csRd_withnotify( ) API command. At 710, the CNS controller 300 at a requesting node (RN) receives the csRd_withnotify( ) request, and a determination is made at 711, FIG. 7 as to whether the requesting node corresponds to the preferred home. If, at 711, the requesting node receiving the request is not the PH, then the process proceeds to 715 where the request is received at a CNS controller at the NH in which, in response at 716, the CNS controller at that node determines whether the hash element exists. If, at 716, it is determined that the requesting node is a NH and the hash element for the tuple name exists, then the process proceeds to 718 where a determination is made by that CNS controller as to whether the remote tuple exists at the NH. If a remote tuple does not exist, the process proceeds to step 725. At step 725, FIG. 7, the CNS controller at the NH runs a process to create a pending record to record a request for a tuple before the csOUT is received. When a csOUT is received for the corresponding tuple name, the process proceeds to 740, FIG. 7, where the CNS controller at the AH for that tuple name accesses the created remote tuple record at the Actual Home and at 742 retrieves the tuple record at the AH. Then, the process returns the tuple data to the requesting process, e.g., Proc 1, at 745, FIG. 7. The process then proceeds to 720, FIG. 7. Otherwise, if at 718, it is determined at the NH a remote tuple does exist for that tuple name, the process proceeds directly to step 740 where the steps 740, 742 and 745 are successively performed and then the process then proceeds to 720, FIG. 7.

Otherwise, referring back to 716, FIG. 7, if it is determined that the receiving node is the NH and the hash element for the tuple name does not exist, then the process next proceeds to 717 where the CNS controller creates a hash element corresponding to that tuple at the NH node. Then the CNS controller process will proceed to steps 725 to create a pending record at the NH and then continue to step 740 when a csOUT for the corresponding tuple name is received to successively perform steps 740, 742 and 745 after which the process then proceeds to 720, FIG. 7.

Otherwise, returning to 711, FIG. 7, if it is determined that the requesting node receiving the request is the PH node, then the process proceeds to 712 where the CNS controller determines whether, at the PH node, a hash element exists corresponding to the tuple name of the csRd_withnotify( ) request. If, at 712, it is determined that the hash element does not exist, then the process proceeds to 715 where the request is received at a CNS controller at the NH node in which, in response at 716, the CNS controller at that node determines whether the hash element exists. If, at 716, it is determined that the node is a NH and the hash element for the tuple name exists, then the process proceeds to 718 where a determination is made by that CNS controller as to whether a remote tuple exists at the NH node. If a remote tuple does not exist, the process proceeds to step 725, FIG. 7, where the CNS controller at the NH runs a process to create a pending record. When a csOUT is received for the corresponding tuple name, the process proceeds to 740, FIG. 7, where the CNS controller at the AH for that tuple name accesses the created remote tuple record at the Actual Home and at 742 retrieves the tuple record at the AH. Then, the process returns the tuple data to the requesting process, e.g., Proc 1, at 745, FIG. 7 before proceeding to 720, FIG. 7. Otherwise, if at 718, it is determined that the NH does have a remote tuple existing for that tuple name, the process proceeds directly to step 740 where the steps 740, 742 and 745 are successively performed before proceeding to 720, FIG. 7.

Otherwise, referring back to 716, FIG. 7, if it is determined that the node is the NH and the hash element for the tuple name does not exist, then the process proceeds to 717 where the CNS controller creates a hash element corresponding to that tuple name at the NH node. Then the process will proceed to steps 725 to create a pending record at the NH and thereafter successively perform steps 740, 742 and 745 when a csOUT is received for the corresponding tuple name. The process then proceeds to 720, FIG. 7.

Otherwise, if it is determined at 711, FIG. 7 that the receiving node is the PH in the corresponding CNS, then the process proceeds to 712 where a further determination is made as to whether the hash element exists at the PH for the specified tuple name. If at 712 it is determined by the CNS controller that a hash element exists (has been created for the specified tuple name) then the process proceeds to 722 where a determination is made as to whether at the PH a corresponding tuple exists. If it is determined at 722, that a tuple does not exist, then the process proceeds back to 715, FIG. 7 where one or more of the steps 715-718 culminating in the creation of a hash element. e.g., hash element 515, at the NH node by the CNS controller 300 and the creation by CNS controller tuple engine of a pending record at the NH node for that tuple name at 725. That is, responsive to the csRd_withnotify( ) request command, the CNS controller creates a new pending tuple record 580 in the CNS (FIG. 6A). When a csOUT is received for the corresponding tuple name the process continues to 740 where the CNS controller retrieves the created tuple record at the AH node and returns the data to the requesting process, e.g., Proc 1, at 745, FIG. 7. The process then proceeds to 720, FIG. 7.

Once the data at the tuple record for the specified tuple name in the received csRd_withnotify( ) request has been returned to the requesting process at 745, the process proceeds to 720 where the CNS controller creates a pending notify record 650 (FIG. 6A) or 690 (FIG. 6B) to record at the CNS controller the process identification, e.g., a process id and the request tag associated with the read with notify request. For type 1 notification this is one of the pending record in 675 i.e., record 650 or 651, etc. As shown in FIG. 6B, for a type 2 notification the CNS controller creates a pending notify record 690 to record at the CNS controller the process identification, e.g., a process id, request tag associated with the read with notify request this is one of the pending record in 685 i.e., record 690 or 691, etc. Then, at 730, the CNS controller makes a determination as to whether the received pending notify request is a first pending notify request. If at 730, the CNS controller determines that the received pending notify request is a first pending notify request, the CNS controller links the hash element at 735 to an address of the created pending notify record by embedding the type "1" pointer 610 stored at the hash element 515 or embedding the type "2" pointer 682 stored at the tuple record 680.

Otherwise, at 730, FIG. 7, if the CNS controller determines that the received pending notify request received from a process is not a first pending notify request, the CNS controller links current last pending notify e.g., 651 to the next newly created pending notify on this hash element. That is, the 64 bit "next" pointer 655 of pending notify record 650 will point to the next record 651 of the pending notification list 675. Similarly, the CNS controller links a current last pending notify, e.g. 691 to the next newly created pending notify on this hash element. That is, the 64 bit "next" pointer 692 of pending notify record 690 will point to the next record 691 of the pending notification list 685.

In the pub/sub configuration, when another process, e.g., process 2, issues a csIN or csREMOVE to modify or remove the tuple from the CNS—the CNS controller 300 finds the pending notify record pointer stored either as part of hash element (type1) or as part of the linked tuple record (type 2).

FIG. 8 depicts a method 800 for notifying a subscribing process when an NDE has been created or removed and the Notifytype parameter was set to type="1". The method 800 includes a publication process for enabling the system to provide the notification to the subscribing process(es) that have read the tuple (csRD or csIn), e.g., process P1, when a second process P2 accesses and attempts to modify or remove the tuple. The method 800 is applicable for informing a plurality of subscribing processes when the process P2 accesses and attempts to modify or remove the tuple.

Initially, at 805, a second process, P2, issues a csIN on the same "tuple name" as a subscribing process. At 810, the CNS controller 300 at the actual home receives the issued request from process P2. In response, at 815, the CNS controller determines whether a hash element exists corresponding to the tuple name of the issued request. If at 815, it is determined that the hash element has not been created and the received request is a csIN( ) request, the process proceeds to 817 where the CNS controller creates a new pending tuple record in the CNS.

Otherwise, at 815, if it is determined that the hash element does exist, then the process proceeds to 820 where a determination is made as to whether there is a pending notify indicator at the hash element (i.e., Notifytype=type "1") pointing to a first pending notify record at list 675.

If, at 820, it is determined that there is a pending notify indicator (pointer 610) at the hash element, the CNS controller at 825 iterates through and accesses each of the stored linked pending notify records from list 675 and obtains requestor information, e.g., address of the corresponding sharing process, from each and generates and communicates the notification message to each respective process. Then the controller issues a completion to second process P2 with data if the received request from P2 is csIN( ).

Returning to 820, if it is determined that there is no pending notify indicator at the hash element, the CNS controller proceeds to 830 and issues a completion to P2 with data if the received request from P2 is csIN( ).

FIG. 6B depicts a status of an example CNS hardware support system 601 in which a first Named Data element, e.g., tuple record 680, has been created for a first tuple name, "Key 1" 608 as requested by a local process in accordance with the system of FIG. 5. As shown in FIG. 6B, the CNS architecture provides hardware support system 601 for efficiently notifying the local and/or any remote process when a specific tuple has been removed/modified by another process running in the CNS architecture.

FIG. 6B depicts an alternative embodiment in which, responsive to the received csRd_withnotify( ) request, an actual home of the tuple containing a corresponding NDE, e.g., tuple record 680, is configured to store a pending notify pointer 682 that points to a pending notify record 690 created by the CNS controller. In an embodiment, pending notify record 690 includes metadata content 695 including requestor information of the requesting process (e.g., a process identifier of or an address location for process P1) for indicating to the CNS controller of an expectation that the process, e.g., the process P1, is expected to receive a notification due to any subsequent activity to remove/modify the tuple data of that tuple name by another process, e.g., a process P2.

In one embodiment, responsive to receiving the csRd_withnotify( ) request, when the Notifytype parameter is set to type "2", the CNS controller responds by providing, in addition to any existing local tuple metadata 683 including local tuple fields pointing to data 630 stored in memory, a pending notify pointer 682, e.g., a 64 bit pointer, on the actual tuple record 680 that points to a corresponding pending notify record 690 stored in memory that is used to provide a notification to waiting processes of an addition or deletion of a specific tuple record for this tuple name (as there is a single hash element 515 for every tuple name).

The CNS controller responds by generating the pending notify record 690 and storing it in near memory. The pending notify record 690 maintained by the CNS controller in a list includes, e.g., a 64 bit next pointer 692 to the next pending notify type 2 record of the list, i.e. 691 corresponding to other subscriber processes, e.g., process P2, P3.

Further, in an embodiment, responsive to receiving several csRd_withnotify( ) requests for processes that indicate the same tuple name, the CNS controller further generates a pending notify list 685 that includes a linked list of pending notify records 690, 691, etc., each record having a process identifier information 695 of a respective process requesting to receive the notification.

Figure 9:
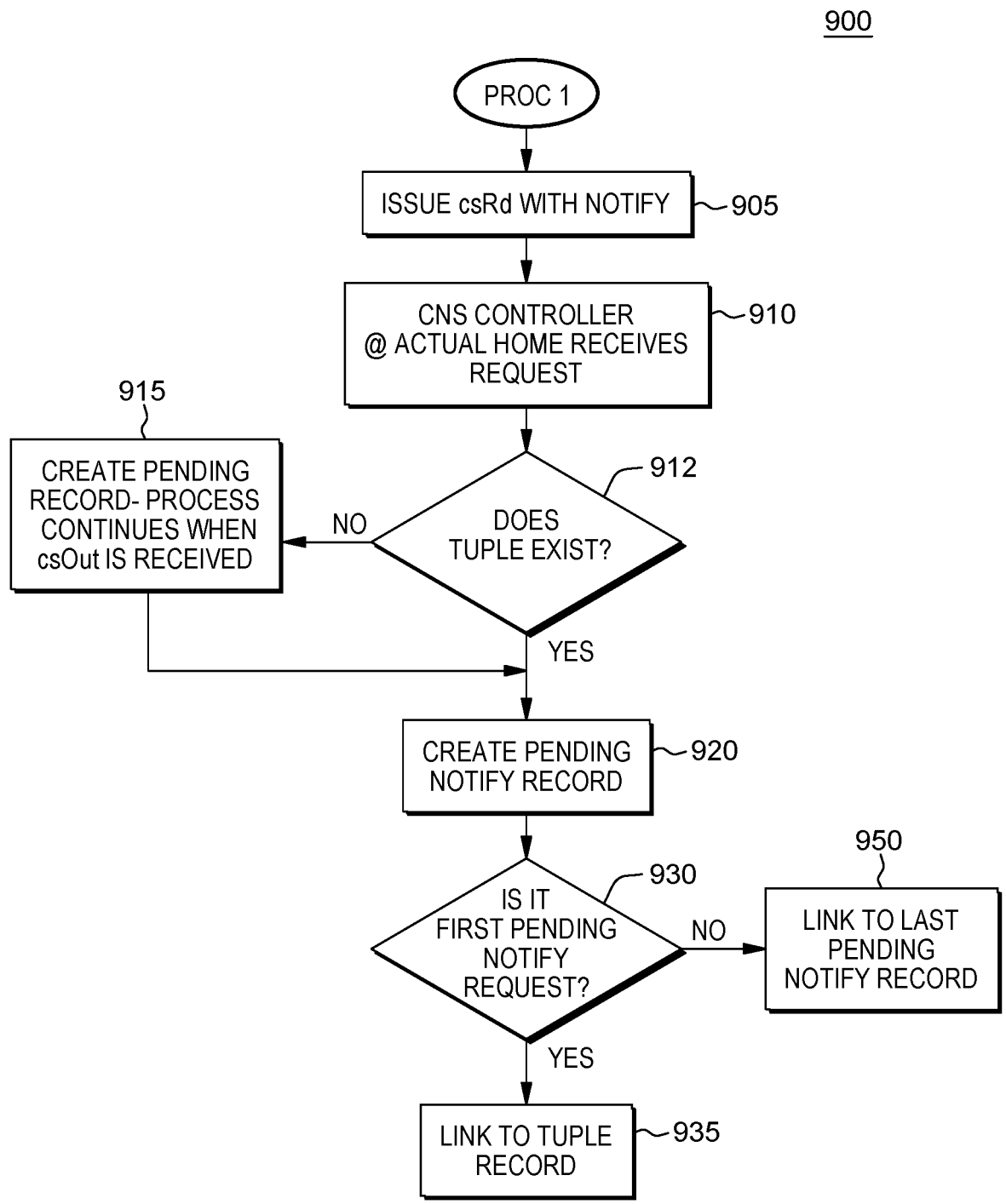
FIG. 9 generally depicts a method run at the CNS controller of a CNS system node responsive to receiving a csRD_withnotify( ) API request for performing a type "2" process notification in an embodiment.
Figure 10:
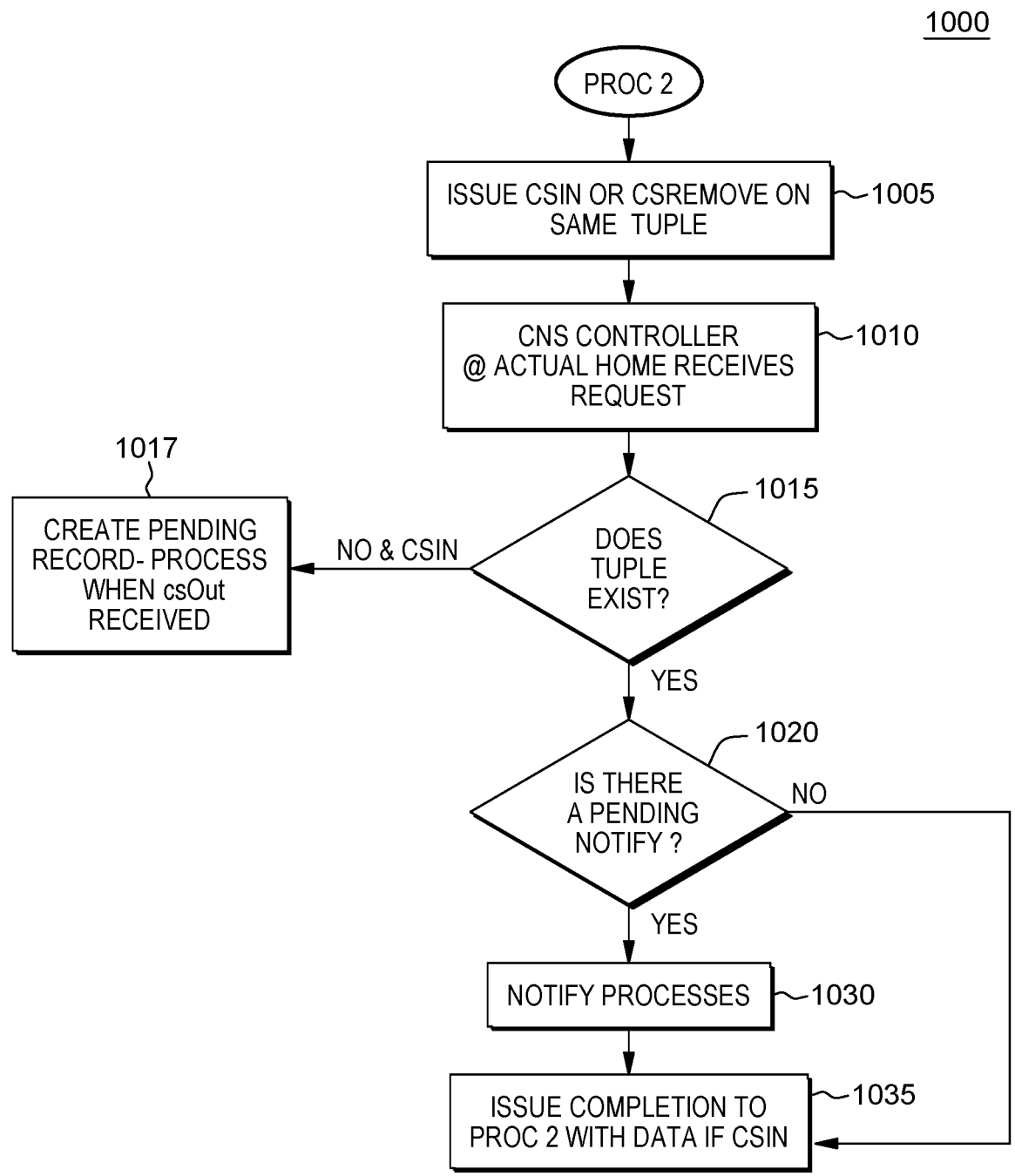
FIG. 10 depicts a method run at the CNS controller for notifying a subscribing process when a NDE has been created or removed and the notify type parameter is set to type "2".

FIGS. 9 and 10 depict a pub/sub processing for tuple checkout with notification in the tuple space/CNS namespace architecture. In particular, FIG. 9 depicts a method 900 for notifying a process when a specific NDE has been created or removed and the Notifytype parameter is set to type="2". The method 900 includes a subscription process for enabling a process, e.g., process P1, to be notified when the data of a tuple record it is monitoring becomes stale or is being modified or removed by another process, e.g., process P2, such that the subscribing process can decide whether to keep/use or re-fetch the tuple record's data content.

In the method 900, at 905, the first process, e.g., P1, issues a csRd_withnotify( ) API command. At 910, the CNS controller 300 at the actual home receives the csRd_withnotify( ) request. In response, at 912, the CNS controller determines whether a tuple exists corresponding to the tuple name of the csRd_withnotify( ) request.

If, at 912, it is determined that the tuple does not exist, then the process proceeds to 915 where the CNS controller creates a new pending tuple record in the CNS. When a csOUT( ) is received the process continues to 920. Otherwise, if at 912, it is determined that the tuple does exist at the NH node, then the process proceeds to 920 where the CNS controller creates a pending notify record 690 to record at the CNS controller the process (P1) that created the notification request. Then, at 930, the CNS controller makes a determination as to whether the received pending notify request is a first pending notify request. If at 930, the CNS controller determines that the received pending notify request is a first pending notify request, the CNS controller links the created pending notify record (e.g., record 690) to the tuple record (e.g., record 680) by embedding using the type "2" pointer 682 stored at the tuple record 680. Otherwise, if the CNS controller determines that the received pending notify request is not a first pending notify request, then at 950, the CNS controller appends the newly created pending notify request to the last to the last pending notify record in the list of pending notify records of type 2 for that particular tuple record. That is, the 64 bit "next" pointer 692 of pending notify record 691 will point to the new pending notification record that was just created. For example, the local tuple pointer 682 of tuple record 680 will point to pending notification record 691 which stores and provides the requesting process information corresponding to the process expected to receive the notification.

FIG. 10 depicts a method 1000 for notifying a subscribing process when a NDE has been created or removed and the Notifytype parameter was set to type="2". The method 1000 includes a publication process for enabling the CNS system to provide the notification to the subscribing process P1, when a second process P2 modifies/removes the tuple.

Initially, at 1005, a second process, P2, issues a csIN or csREMOVE on the same "tuple name" (keyname). At 1010, the CNS controller 300 at the actual home receives the issued request from process P2. In response, at 1015, the CNS controller determines whether a tuple exists corresponding to the tuple name of the issued request. If, at 1015, it is determined that the tuple has not been created and the received request is a csIN( ) request, the process proceeds to 1017 where the CNS controller creates a new pending tuple record in the CNS.

Otherwise, at 1015, if it is determined that the tuple does exist, then the process proceeds to 1020 where a determination is made as to whether there is a pending notify pointer at the tuple 680 (i.e., Notifytype=type "2"). If, at 1020, it is determined that there is a pending notify indicator at the tuple record 680, the CNS controller at 1030 accesses the pending tuple notification record, e.g., record, 690 and retrieves the address information of the process requesting the notification stored at metadata field 695.

The CNS controller at 1030 further accesses the stored pending notify records from list 685 and obtains requestor information, e.g., process id of the respective processes, and notifies the sharing processes, including process P1, of the creation/deletion of tuple record. In an embodiment, the CNS controller iterates through each pending notification record of the pending notification list. That is, the CNS controller traverses each pending notify record 690, 691, etc., attached in the list 685, and at each iteration, for a respective process: identifies in a first and each next pending notification record of the list, an identifier information of the respective requesting process identified in the respective requestor field 695 to be notified. The CNS controller then generates and communicates a notification message to the notification queue associated with the respective requesting process at an identified location address. In an embodiment, the CNS controller looks up—in a process table that was updated when the process attaches to the CNS controller—to find the return notification queue or completion queue memory address corresponding to the last entry in these queues. The notification is written to that memory address accordingly. Communications from the CNS controller to each process can be via a system bus (if the process is local) or over a network connection via the NIC. The respective process can choose to ignore or retrieve the new tuple information again after processing the notification event.

The process then continues to 1035 where the CNS controller issues a completion to P2 with data if the received request from P2 is csIN( ).

Otherwise, returning to 1020, FIG. 10 if it is determined that there is no pending notify indicator at the tuple pending record, the CNS controller proceeds to 1035 where the CNS controller issues a completion to P2 with data if the received request from P2 is csIN( ).

In each embodiment depicting the publication, the CNS controller retrieves the linked tuple record and obtains the details of the process, e.g., process 1, that is waiting for any notification on this tuple record as provided in the corresponding pending notification record, and sends an notification to process 1, and any other linked pending notification records linked in list 675 (for type 1 notifications) and/or 685 (for type 2 notifications). The CNS controller then deletes each pending notify record it processed. If multiple records exists in the pending notify list 675 and/or 685, the CNS generates and communicates a notification to each one of the sharing processes and deletes the pending notify records in the list.

In response to receiving the notification at a subscribing process, e.g., Process 1, the process decides if it needs to read the tuple record content again or throw away the tuple data it retrieved previously.

In embodiments, methods are invoked to notify one or more processes that share tuples and that monitor activity on a tuple record that it (the tuple) has been removed from the system by another process. CNS controller hardware and software run at the CNS node allows monitoring a tuple's NDE and triggering a notification for a process when a tuple is removed, created or updated.

As described with respect to FIG. 3, helper thread processes (not shown) running on CPU/caches 340 assist in sending/receiving messages across nodes and keep track of the creation and deletion of the tuple record with corresponding notification requests at tuple checkout. In support of tuple notification operations in the CNS storage system, the node running processes issuing notification command maintains both a monitor queue 360 and corresponding notify queue 362 which are both software queues. These software client-side structures assist the client in identifying when a CNS controller returns a notify event.

In particular, returning to FIG. 3, when a client process issues a command for reading a tuple with a request for notification, the client process requesting notification issues and stores a tag or like pending notify indicator for storage in a monitor queue 360 to track that that process has requested and is expecting a notification for a particular tuple (keyname). In an embodiment, the client process requesting notification generates for storage in the monitor queue the "Returntag" parameter of the csRd_withnotify( ) API to enable identifying the request when a response is sent back by the CNS controller to the process. Further, the notify queue 362 is configured to receive and store the indication from the CNS controller 300 that another process has issued the csIn( )/csRead( ) command. In an embodiment, the CNS controller will write to this queue on the requestor process indicating a notification for a tuple it requested previously. For example, if the CNS controller issues a notification and arrives at the notify queue 362 and if there is no corresponding indicator or returntag in the monitor 360, the notification received from the CNS controller is dropped as it's not in the monitor queue.

In a further embodiment, the CNS controller provides a mechanism to remove a process's subscription for a tuple notification. In such a case, the client process that previously subscribed the notification by issuing a csRd_notify can issue an API call cancel_notify(tuplename,notifytype,requesttag) where "requesttag" is the tag associated with the previous notify request that gets stored in the pending notify record. Based on the notification type—the request finds its way to the appropriate pending notify record list in the hash element(notify type=1) or in the tuple record (notify type=2) and deletes the particular notify record in the linkedlist that matches the client requests process id and requesttag.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

Having thus described our invention, what we claim as new, and desire to secure by Letters Patent is:

1. A method for notifying one or more processes of a creation or removal event associated with a named data element (NDE) created in a coordination namespace, the one or more processes running at one or more distributed computing nodes sharing the coordination namespace, the method comprising:
   generating, by a controller running at a computing node, a named data element (NDE) for a requesting process running at the computing node; the NDE comprising a tuple record associated with a keyname, the tuple record having a pointer to data associated with the process, the data being stored in a memory associated with the node, the controller generating a linked list of multiple tuple records corresponding to the keyname for multiple additional processes storing or accessing data that are running at one or more distributed computing nodes;
   receiving, at the controller, from the requesting process and other requesting processes running at one or more distributed computing nodes, a corresponding request with notify message when accessing the stored associated data corresponding to a tuple record of the corresponding keyname;
generating, by the controller, responsive to each corresponding received request with notify message, a corresponding pending notification record for the requesting process, each pending notification record linked to a tuple record of the associated keyname and having information including a respective process identifier including a respective location for the respective requesting process to receive a notification of a creation or removal of the generated NDE associated with the keyname, the pending notification records stored as a linked list in the memory at the computing node;
detecting, by the controller, another process running at one or more of the distributed computing nodes creating a new named data element for the associated keyname or removing, by the another process, the generated named data element corresponding to the associated keyname for the local process;
in response to the detecting, identifying, by the controller, in each of the pending notification records of the linked list, the process identifier of each requesting process; and
communicating, by the controller, a notification message to each respective requesting process corresponding to the respective process identifier, the notification message indicating to the requesting process of the creating or removing of the generated NDE for the requesting process.

2. The method of claim 1, further comprising: prior to generating a pending notification record for the requesting process, returning, by the controller, to the requesting process, the requested associated stored data from the generated NDE.

3. The method of claim 1, wherein the generating of corresponding pending notification record for the requesting process comprises:
generating, by the controller, responsive to each respective subsequent received request with notify message, a respective next pending notification record for the respective requesting process.

4. The method of claim 3, further comprising:
linking, by the controller, the pending notification record and each respective next pending notification record to form the linked list of pending notification records generated for each respective subsequent data access request with notify received for each respective process of the multiple processes,
wherein each next pending notification record is appended to a last pending notification record of the list of pending notification records.

5. The method of claim 4, wherein, in response to the detecting the creating, by another process, a new named data element for the keyname or removing the generated named data element, the method further comprises:
iterating through each pending notification record of the pending notification linked list, and at each iteration, for a respective process:
identifying, by the controller, in a first and each next pending notification record of the list, an indentification information of the respective requesting process;
communicating, by the controller, a notification message to the respective requesting process at the identified location address indicated in the next pending notification record of the list, the notification message providing an option for the respective process to obtain the data associated with the requesting process.

6. The method of claim 5, wherein the received request with notify message includes a first type notify indicator, the method further comprising:
determining whether the received request with notify message to access the stored associated data from the requesting process is a first request message, and if it is a first request message received, the method further comprising:
generating, by the controller, a pointer in a hash element used for accessing the named data elements, the pointer pointing to a first generated pending notification record of the linked list of pending notification records for the requesting process.

7. The method of claim 6, wherein in response to the detecting, the iterating through each pending notification record of the pending notification linked list comprising:
accessing the hash element associated with the keyname and using the pointer in the hash element to access the first generated pending notification record to obtain the process identifier of the requesting process.

8. The method of claim 5, wherein the NDE comprises a tuple record associated with a request for storing data for a process, the tuple record associated with a keyname and storing a tuple metadata for the data associated with the process and a pointer to a memory location storing the associated data, the hash element storing a further pointer to linked list of tuple records associated with a keyname and the controller further using the hash element to point to a pending tuple record of the linked list to access the stored data associated with the respective process.

9. The method of claim 8, wherein the received request with notify message includes a second type notify indicator, wherein in response to the receiving, the method further comprising:
determining whether the received request with notify message to access the stored associated data from the requesting process is a first request message, and if it is a first request message received, the method further comprising:
generating, by the controller, a pointer in a tuple record associated with a process requesting access, the pointer pointing to a first generated pending notification record of the list of pending notification records for the requesting process.

10. The method of claim 9, wherein in response to the detecting, the iterating through each pending notification record of the pending notification list comprises:
accessing the tuple record associated with the keyname and using the pointer in the tuple record to access the first generated pending notification record to obtain the process identifier of the requesting process.

11. A system for notifying one or more processes of a creation or removal event associated with a named data element (NDE) created in a coordination namespace, the one or more processes running at one or more distributed computing nodes sharing the coordination namespace, the system comprising:
one or more data generated by requesting processes running at a current computing node; and
a memory storage element associated with a current node of the multi-node computing system sharing the coordination namespace; and
a controller circuit coupled with the memory storage element, the controller circuit configured to:

generate, for a requesting process, a named data element (NDE) for storage in a memory at the computing node, the NDE comprising a tuple record associated with a keyname, the tuple record having a pointer to data associated with the process, the data being stored in the memory and generate a linked list of multiple tuple records corresponding to the keyname for multiple additional processes storing or accessing data that are running at one or more distributed computing nodes;

receive, from the requesting process and other requesting processes running at one or more distributed computing nodes, a corresponding request with notify message when accessing the stored associated data corresponding to a tuple record of the corresponding keyname;

generate, responsive to each corresponding received request with notify message, a corresponding pending notification record for the requesting process, each pending notification record linked to a tuple record of the associated keyname and having information including a respective process identifier including a respective location for the respective requesting process to receive a notification of a creation or removal of the generated NDE associated with the keyname, and store the pending notification records as a linked list in the memory at the computing node;

detect another process running at one or more of the distributed computing nodes creating a new named data element for the associated keyname or removing, by the another process, the generated named data element corresponding to the keyname for the requesting process;

in response to the detecting, identify in each of the pending notification records of the linked list, the process identifier of each requesting process; and communicate a notification message to each respective requesting process corresponding to the respective process identifier, the notification message indicating to the requesting process of the creating or removing of the generated NDE for the requesting process.

12. The system of claim 11, wherein the controller is further configured to:
prior to generating a pending notification record for the requesting process, return to the requesting process the requested associated stored data from the generated NDE.

13. The system of claim 11, wherein to generate the corresponding pending notification record for the requesting process, the controller circuit is further configured to:
generate responsive to each respective subsequent received request with notify message, a respective next pending notification record for the respective requesting process.

14. The system of claim 13, wherein the controller circuit is further configured to:
link the pending notification record and each respective next pending notification record to form the linked list of pending notification records generated for each respective subsequent data access request with notify received for each respective process of the multiple processes,
wherein each next pending notification record is appended to a last pending notification record of the list of pending notification records.

15. The system of claim 14, wherein, in response to the detecting the creating, by another process, a new named data element for the keyname or removing the generated named data element, the controller circuit is further configured to:
iterate through each pending notification record of the pending notification linked list, and at each iteration, for a respective process:
identify in a first and each next pending notification record of the list, an identifier of the respective requesting process;
communicating, by the controller, a notification message to the respective requesting process at the identified location address indicated in the next pending notification record of the list, the notification message providing an option for the respective process to obtain the data associated with the requesting process.

16. The system of claim 15, wherein the received request with notify message includes a first type notify indicator, the controller circuit is further configured to:
determine whether the received request with notify message to access the stored associated data from the requesting process is a first request message, and if it is a first request message received;
generate a pointer in a hash element used for accessing the named data elements, the pointer pointing to a first generated pending notification record of the linked list of pending notification records for the requesting process.

17. The system of claim 16, wherein in response to the detecting, to iterate through each pending notification record of the pending notification linked list, the controller circuit further configured to:
access the hash element associated with the keyname and using the pointer in the hash element to access the first generated pending notification record to obtain the identification information of the requesting process.

18. The system of claim 15, wherein the NDE comprises a tuple record associated with a request for storing data for a process, the tuple record associated with a keyname and storing a tuple metadata for the data associated with the process and a pointer to a memory location storing the associated data, the hash element storing a further pointer to linked list of tuple records associated with a keyname and the controller circuit further using the hash element to point to a pending tuple record of the linked list to access the stored data associated with the respective requesting process.

19. The system of claim 18, wherein the received request with notify message includes a second type notify indicator, wherein in response to the receiving, the controller circuit further configured to:
determine whether the received request with notify message to access the stored associated data from the requesting process is a first request message, and if it is a first request message received, the controller circuit further configured to:
generate a pointer in a tuple record associated with a process requesting access, the pointer pointing to a first generated pending notification record of the list of pending notification records for the requesting process.

20. The system of claim 19, wherein in response to the detecting, to iterate through each pending notification record of the pending notification list, the controller circuit further configured to:

access the tuple record associated with the keyname and using the pointer in the tuple record to access the first generated pending notification record to obtain the process identification information of the requesting process.

\* \* \* \* \*